United States Patent
Yokoyama et al.

(10) Patent No.: US 6,484,942 B1
(45) Date of Patent: Nov. 26, 2002

(54) INFORMATION STORAGE MEDIUM, INFORMATION REPRODUCING APPARATUS, GAME MACHINE AND ITS INFORMATION REPRODUCING METHOD

(75) Inventors: Nobuo Yokoyama, Sendai (JP); Eiji Takuma, Tokyo (JP); Takashi Matsuda, Tokyo (JP)

(73) Assignee: Sega Enterprises Ltd., Tokyo (JP)

( * ) Notice: Subject to any disclaimer, the term of this patent is extended or adjusted under 35 U.S.C. 154(b) by 0 days.

(21) Appl. No.: 09/074,932

(22) PCT Filed: Nov. 18, 1996

(86) PCT No.: PCT/JP96/03372

§ 371 (c)(1),
(2), (4) Date: Oct. 20, 1998

(87) PCT Pub. No.: WO97/19420

PCT Pub. Date: May 29, 1997

(30) Foreign Application Priority Data

Nov. 17, 1995 (JP) .............................. 7-300155

(51) Int. Cl.⁷ ............................................... G06K 7/10
(52) U.S. Cl. ..................................... 235/462.03; 463/8
(58) Field of Search ..................... 235/462.03, 462.01; 463/8; 273/440.1

(56) References Cited

U.S. PATENT DOCUMENTS

| | | | | |
|---|---|---|---|---|
| 3,752,961 A | * | 8/1973 | Torrey | 235/437 |
| 4,358,278 A | * | 11/1982 | Goldfarb | 434/337 |
| 4,422,361 A | * | 12/1983 | Ishii et al. | 84/637 |
| 4,729,564 A | * | 3/1988 | Kuna et al. | 463/9 |
| 4,983,815 A | * | 1/1991 | Kumasaka | 235/462.03 |
| 5,398,717 A | * | 3/1995 | Goncze | 137/270 |
| 5,627,900 A | * | 5/1997 | Wooley et al. | 381/118 |
| 5,813,861 A | * | 9/1998 | Wood | 434/169 |
| 5,839,957 A | * | 11/1998 | Schneider et al. | 463/20 |
| 5,938,196 A | * | 8/1999 | Antoja | 273/143 C |
| 5,967,514 A | * | 10/1999 | Kelly et al. | 273/138.1 |
| 5,971,397 A | * | 10/1999 | Miguel et al. | 273/371 |
| 6,030,290 A | * | 2/2000 | Powell | 463/36 |

OTHER PUBLICATIONS

Roger C. Palmer *The Bar Code Book*, Helmers Publishing, 1995, pp. 15–22.*

* cited by examiner

*Primary Examiner*—Mark Tremblay
(74) *Attorney, Agent, or Firm*—Keating & Bennett, LLP

(57) ABSTRACT

Reading sections (21a, 21b) wherein disks (10a, 10b) bearing barcodes are installed, are provided, and code sensors (23a, 23b) for reading out these barcodes are provided in the reading sections (21a, 21b). When a player rotates a disk (10a, 10b) installed on a turntable (22a, 22b), the barcode is read out by the code sensors (23a, 23b), and parameters are set respectively on the basis of this barcode. Thereafter, if the player rotates the disk (10a, 10b) while simultaneously operating the buttons (25a–27a, 25b–27b), this combination is input as a command, and the game is developed accordingly. Thereby, it is possible to provide an information storage medium, information reproduction device, game machine, and information reproduction method, whereby code, such as barcode, or the like, can be used effectively.

7 Claims, 27 Drawing Sheets

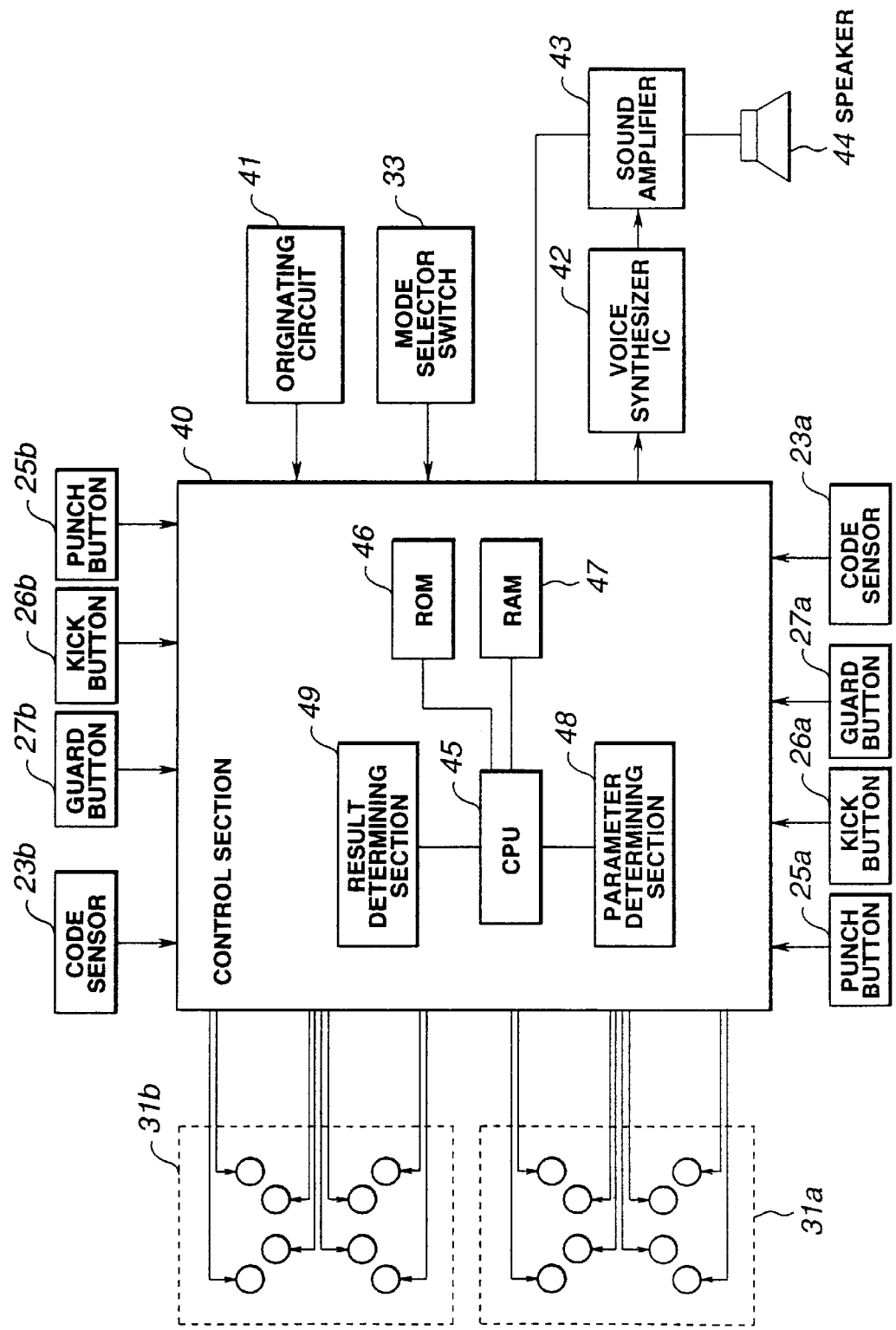

FIG.7(a)

| CODE | LIFE | PUNCH | KICK | GUARD | SKILL 1 | SKILL 2 | SKILL 3 |
|---|---|---|---|---|---|---|---|
| 1 | 16 | 2 | 1 | 2 | 1 | 2 | 5 |
| 2 | 11 | 4 | 1 | 4 | 1 | 2 | 6 |
| 3 | 13 | 1 | 2 | 2 | 4 | 3 | 7 |
| 4 | 15 | 2 | 1 | 2 | 1 | 2 | 5 |
| 5 | 12 | 3 | 1 | 3 | 1 | 2 | 6 |
| 6 | 10 | 1 | 4 | 4 | 4 | 3 | 7 |
| 7 | 8 | 4 | 1 | 4 | 1 | 2 | 5 |
| 8 | 13 | 2 | 1 | 3 | 1 | 2 | 6 |
| 9 | 12 | 1 | 3 | 3 | 4 | 3 | 7 |
| 10 | 16 | 2 | 1 | 2 | 1 | 2 | 5 |

FIG.7(b)

| CODE | GENERATING COMMAND SEQUENCE | ATTACK REGION | POWER |
|---|---|---|---|
| 1 | PR. PR. PR. PR. | UP RIGHT;UP LEFT | 5 |
| 2 | PR. PR. PR. KR. | UP RIGHT;DOWN RIGHT | 6 |
| 3 | PL. PL. PL. KL. | UP LEFT;DOWN LEFT | 6 |
| 4 | KR. KR. KR. KR. | DOWN RIGHT;DOWN LEFT | 6 |
| 5 | KR. KL. KR. KR. | UP RIGHT;UP LEFT;DOWN RIGHT | 7 |
| 6 | KR. KL. KR. KL. | UP RIGHT;UP LEFT;DOWN LEFT | 7 |
| 7 | KR. KL. KR. KL. | UP LEFT;DOWN RIGHT;DOWN LEFT | 7 |
| 8 | PR. PL. PK. KL. | UP RIGHT;UP LEFT; DOWN RIGHT; DOWN LEFT | 8 |

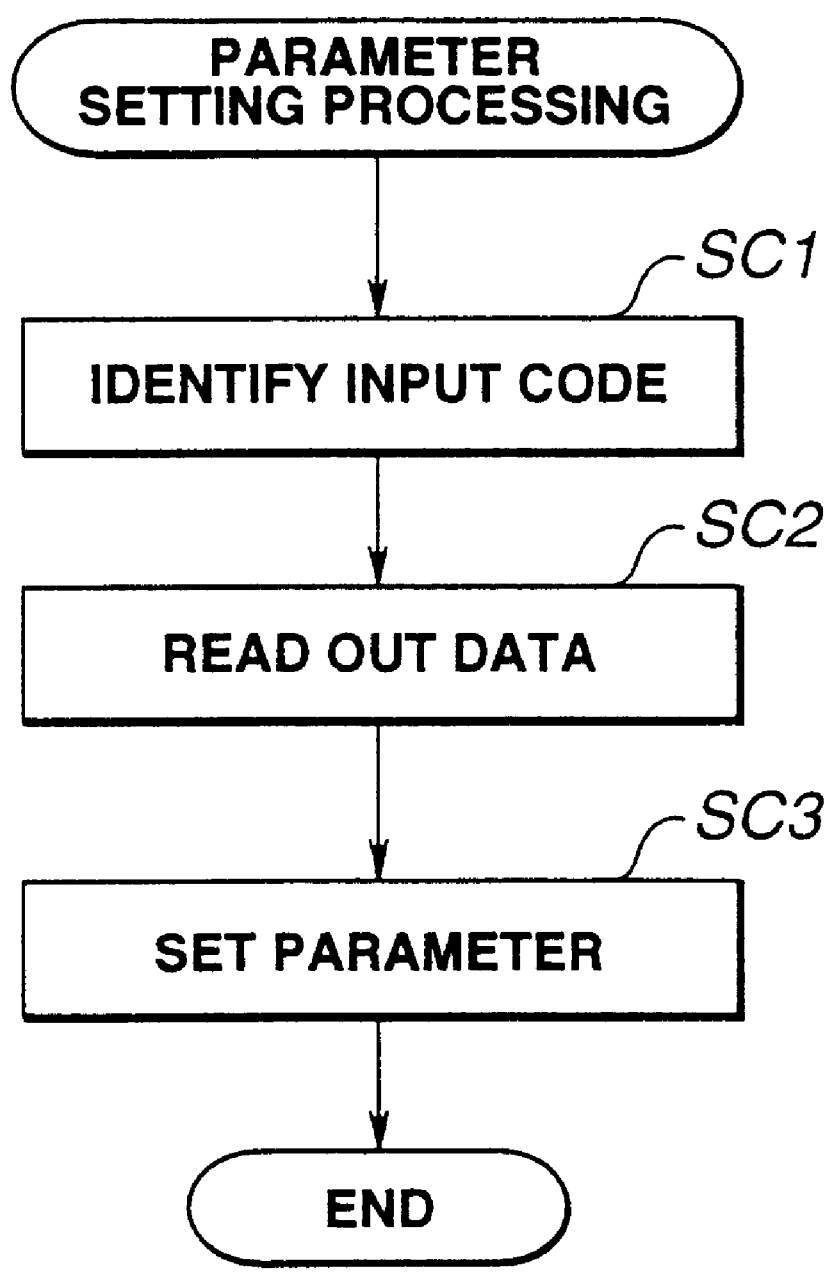

GUARD 4

GUARD 2

FIG.25

| SOUND TYPE \ TRACK | A | B | C | D |
|---|---|---|---|---|
| SOUND(1) | ☐ | ☐ | ☐ | ■ |
| SOUND(2) | ☐ | ☐ | ■ | ☐ |
| SOUND(3) | ☐ | ☐ | ■ | ■ |
| SOUND(4) | ☐ | ■ | ☐ | ☐ |
| SOUND(5) | ☐ | ■ | ☐ | ■ |
| SOUND(6) | ☐ | ■ | ■ | ■ |
| SOUND(7) | ☐ | ■ | ■ | ☐ |
| SOUND(8) | ■ | ☐ | ☐ | ■ |
| SOUND(9) | ■ | ☐ | ■ | ☐ |
| SOUND(10) | ■ | ☐ | ■ | ■ |
| DETERMINE/ RECORD SOUND | ■ | ☐ | ☐ | ☐ |

INFORMATION STORAGE MEDIUM, INFORMATION REPRODUCING APPARATUS, GAME MACHINE AND ITS INFORMATION REPRODUCING METHOD

TECHNICAL FIELD

The present invention relates to an information storage medium, information reproduction apparatus, game machine and its information reproducing method, and more particularly to an information storage medium whereon information is stored by patterning, an information reproduction device which reproduces information stored on this information storage medium, a game machine whereby a game is developed by installing the information storage medium therein, and an information reproduction method whereby information is reproduced.

BACKGROUND ART

The present invention relates to a device which reproduces information by reading out patterns stored on an information storage medium installed therein, and the following can be cited as the most recent conventional technology of this kind.

In the prior art, devices have been proposed whereby code carried on the surface of a card, or the like, is read out optically, and the information represented by this code is reproduced. In particular, various game machines which implement games using cards of this type are known. Barcodes, for example, are used as the aforementioned code. A concrete example of a game machine of this kind is disclosed in Japanese Unexamined Patent 3-193074, or the like. For example, barcodes are read by optical reading means in the game machine, and data, such as the characteristics or strength of a character, is generated on the basis of the information read out. Players can then play a fighting game using such characters by controlling attack buttons, and the like.

In game machines of this kind, a barcode, as borne on all types of product, may also be applied to a card, and fighting games can be played using this code. Furthermore, since it is not possible to tell the characteristics or strength, etc. of a character represented by a card simply by looking at the barcode, a feeling of surprise is generated by the game.

In devices such as a conventional game machine as described above, there is a one-to-one correspondence between code and information. Therefore, by reading code from a single card, it is only possible to implement processes corresponding to that code. For example, in the case of a game machine as described above, the character is determined by the code, and the game contents remain the same, so there is a problem in that the player may lose interest in the game. In this way, in devices using cards displaying a barcode, or the like, it has only been possible to input one item of information using the barcode.

The present invention was devised in view of the problems of the prior art, an object thereof being to provide an information storage medium whereby codes, such as barcodes, can be used effectively.

It is a further object of the present invention to provide an information reproduction device whereby it is possible to reproduce information stored on the aforementioned information storage medium. It is a further object of the present invention to provide a game machine which generates a sense of surprise without losing its level of interest, by using the aforementioned information storage medium. It is a further object of the present invention to provide a game machine whereby game development having a sense of urgency and realism can be expected. It is yet a further object of the present invention to provide an information reproduction method whereby the aforementioned information reproduction device and game machine can be realized.

DISCLOSURE OF THE INVENTION

In the information storage medium according to the present invention, patterns, wherein information is encoded according to prescribed rules, are located in a circular fashion. Since patterns are arranged in a circular fashion, when reading patterns by means of an information reproduction device, the patterns can be read by rotating the information storage medium. Furthermore, it is also possible to read out patterns continuously by rotating the information storage medium.

The information reproduction device according to the present invention comprises: holding means for holding rotatably an information storage medium whereon a pattern formed by encoding information according to prescribed rules is arranged in a circular fashion, constituted such that the information storage medium is rotated manually; reading means for reading out a pattern arranged on the information storage medium when the information storage medium held by the holding means is rotated; and reproducing means for reproducing information corresponding to the pattern read out by the reading means.

Thereby, the operator places an information storage medium in the holding means and by causing it to rotate directly by hand, for example, the pattern arranged on the information storage medium is read out. Information corresponding to this pattern is then reproduced.

Furthermore, the game machine according to the present invention comprises: holding means for holding rotatably an information storage medium whereon a pattern formed by encoding information according to prescribed rules is arranged in a circular fashion; reading means for reading out the pattern on the information storage medium when the information storage medium held by the holding means is rotated; identifying means for identifying the pattern read by the reading means as code; parameter setting means for setting parameters for the information storage medium in accordance with the code identified by the identifying means; rotation detecting means for detecting a rotating operation relating to the information storage medium; storing means for storing game programs; and control means for developing a game in accordance with a program stored by the storing means, on the basis of the properties of the rotating operation as detected by the rotation detecting means and the parameters set by the parameter setting means.

Thereby, when a player installs an information storage medium and causes it to rotate, the pattern on the information storage medium is read out. This pattern is identified as code, and parameters corresponding to the code are set. Thereupon, when the player rotates the information storage medium, this rotating operation is detected and a program is implemented on the basis of the properties of this rotating operation and the aforementioned parameters, thereby developing the game.

In an information reproduction method used in an information reproduction device, into which an information storage medium, whereon patterns formed by encoding information according to prescribed rules are arranged in a circular fashion, is installed rotatably, the information reproduction method according to the present invention comprises the steps of: storing a plurality of codes and information corresponding thereto in storing means; reading the pattern arranged on the information storage medium, when the information storage medium is rotated; identifying the read pattern as code; reading out the information from the recording means in accordance with the identified code; and reproducing the read out information.

Thereby, when an information storage medium is installed and rotated, the pattern arranged on the information storage medium is read, and this pattern is identified as code. Information is read out from the storing means and reproduced in accordance with the identified code. By this method, it is possible to reproduce information corresponding to the pattern in an information reproduction device wherein the information storage medium is installed rotatably.

BRIEF DESCRIPTION OF THE DRAWINGS

FIG. 4(b) illustrates an output signal of a code sensor 23a;

FIG. 5(b) shows the surface of the display section 28a; and FIG. 5(c) shows each area of the surface of the display section 28a;

FIG. 6 is a block diagram showing the internal composition of a game machine main unit according to this mode of implementation;

FIG. 7 is a diagram showing examples of table data in this mode of implementation;

FIG. 10 is a flowchart showing the processing implemented by CPU 45 in this mode of implementation;

FIG. 25 is a diagram showing an example of a sound data table in this mode of implementation;

BEST MODE FOR CARRYING OUT THE INVENTION

In order to describe the present invention in more detail, modes of implementation are described below with reference to the accompanying drawings.

A. First Mode of Implementation (1) Composition of Disk

Firstly, the composition of a disk used in a game machine according to the present mode of implementation will be described. This disk forms the aforementioned information storage medium. FIG. 1 shows an example of the composition of this disk.

Figure 1A:
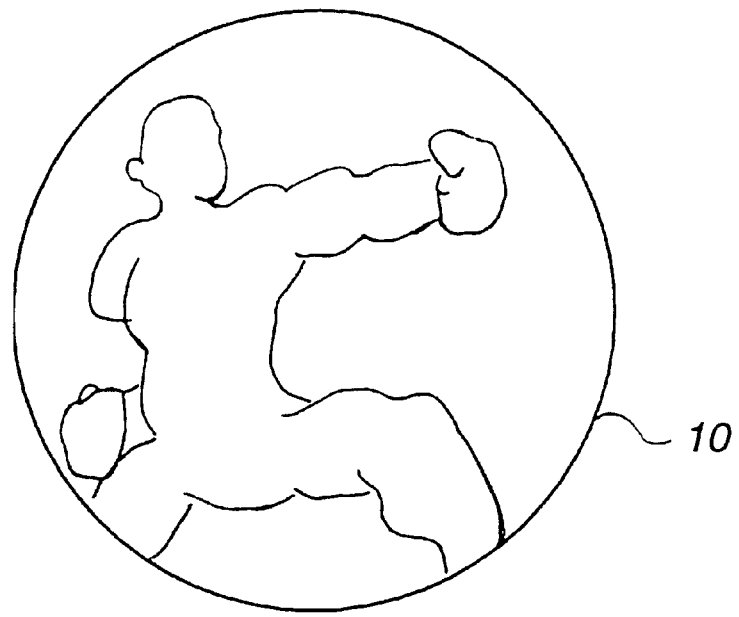
FIG. 1 shows diagrams illustrating the composition of (a) the front surface and (b) the rear surface of a disk 10 according to a first mode for implementing the present invention.
Figure 1B:
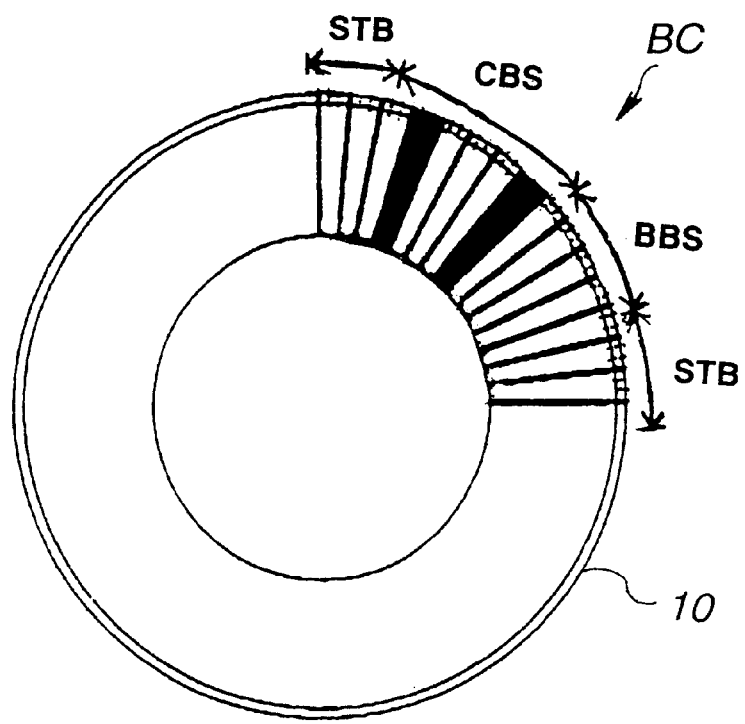

The disk 10 in the present mode of implementation has a diameter of 42 mm, which is the same as the standard size of conventional round "pogs". A picture of a character relating to that disk is depicted on the surface of the disk 10, as illustrated in FIG. 1(a). Furthermore, on the rear surface of the disk 10, a barcode BC is recorded along the edge thereof, as illustrated in FIG. 1(b). This barcode BC comprises: a start bit STB indicating the start of the barcode BC; a code bit sector CBS consisting of code bits representing information; and a blank bit sector BBS which is an empty bit area. The start bit STB consists of a three-figure number (in this case, "000") and the code bit sector CBS and blank bit sector BBS are located between these. The barcode BC has a length from ⅓ to ½ of the overall circumference of the disk, and one set or a plurality of sets thereof are recorded on a single disk. In other words, one, two or three sets of barcode BC of ⅓-circumference length may be provided, and one or two sets of barcode BC of ½-circumference length may be provided. Therefore, if there is one set or two sets of barcode of ⅓-circumference length, or one set of barcode of ½-circumference length, the remaining portion of the surface of the disk 10 will be empty.

(2) Composition of Game Machine Main Unit

Next, the composition of a game machine according to this mode for implementing the present invention is described with reference to FIGS. 2–7.

(External Composition)

Figure 2A:
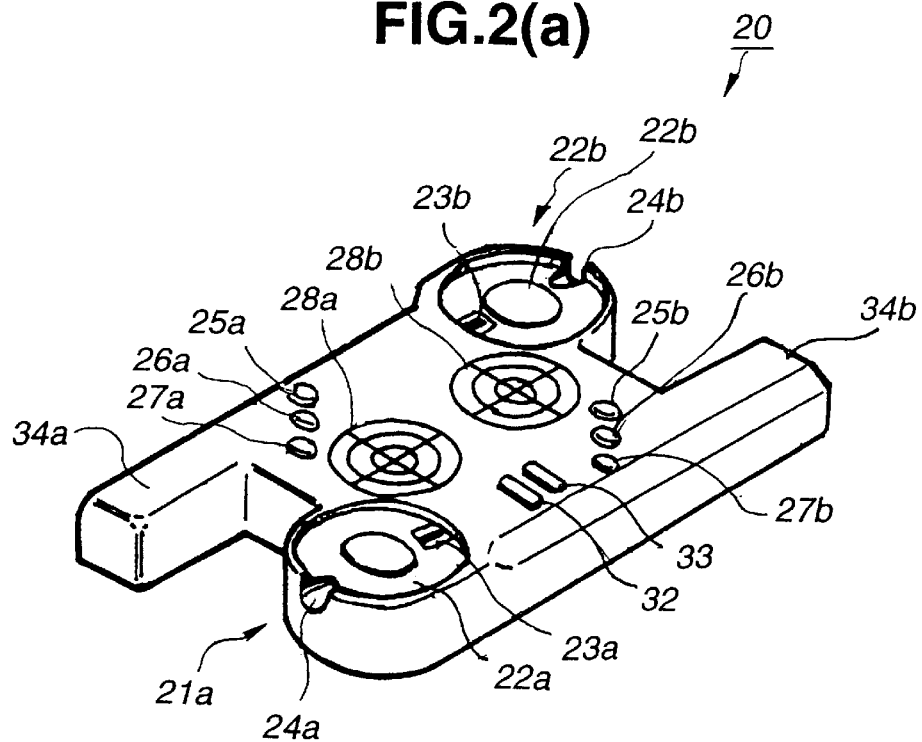
FIG. 2(a) is an oblique view of the composition of a game machine main unit 20 according to this mode of implementation.

Firstly, the external composition of the game machine main unit 20 will be described. FIG. 2(a) is an oblique view showing the external appearance of the game machine main unit 20. As shown in the diagram, reading sections 21a, 21b wherein the disks 10 are inserted are provided on the right-hand side of either end of the game machine main unit 20.

Turntables 22a, 22b, which are holding means for assisting the rotation of the disks 10, and code sensors 23a, 23b, which are reading means for reading barcodes on the disk 10, are provided in these reading sections 21a, 21b. The code sensors 23a, 23b are barcode readers formed by photointerrupters, and they read off the barcodes stored on the disks 10 optically. Groove sections 24a, 24b for the user to insert his or her fingers when removing a disk 10 that has been installed are provided in the reading sections 21a, 21b.

Figure 2B:
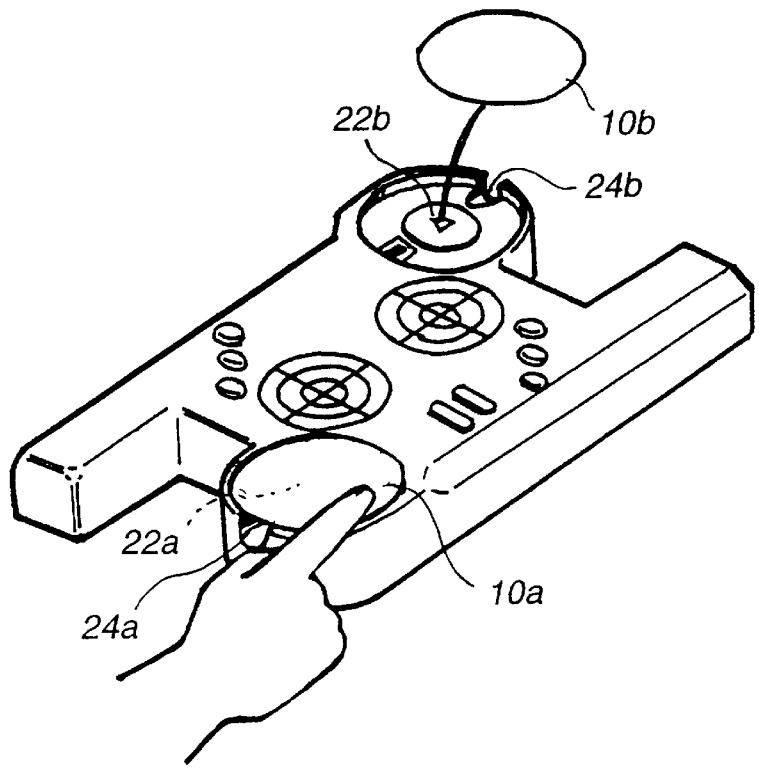
FIG. 2(b) is an oblique view of a state where disks 10a, 10b are installed in the machine.

FIG. 2(b) shows a state where disks 10 are set in these reading sections 21a, 21b. As this diagram shows, the disks 10a, 10b are located respectively on turntables 22a, 22b, and a players causes a disk 10a, 10b to rotate using his or her fingers. When removing the disk 10a, 10b, the user inserts his or her fingers into the groove sections 24a, 24b, and lifts the disk upwards.

Furthermore, in FIG. 2(a), 25a–27a and 25b–27b are buttons for inputting commands, and two sets of these buttons are provided. 25a, 25b are punch buttons for specifying a "punch"; 26a, 26b are kick buttons for specifying a "kick"; and 27a, 27b are guard buttons for specifying a guard.

The player inputs attack commands by operating the aforementioned punch button 25a or kick button 26a, and rotating the disk 10a, simultaneously. These attack commands include "right punch", "left punch", "right kick", and "left kick", and the player decides the means of attack ("punch" and "kick") by operating the punch button 25a or kick button 26a, and decides the direction of attack ("right" or "left") by the direction of rotation of the disk 10. In concrete terms, the attack commands are determined as described below.

(punch button)+(rotate right) ->(right punch)
(punch button)+(rotate left) ->(left punch)
(kick button)+(rotate left) ->(right kick)
(kick button)+(rotate right) ->(left kick)

By inputting attack commands in this way, damage can be inflicted to a corresponding part of the opponent. In this case, if "right punch" is input, then the opponent will be damaged on the "left hand", and if "left punch" is input, then the opponent will be damaged on the "right hand". Furthermore, if "right kick" is input, then the opponent will be damaged on the left foot, and if "left kick" is input, then the opponent will be damaged on the "right foot".

Furthermore, the player also inputs defensive commands by operating guard buttons 27a and rotating the disk 10a. In this case, if the player rotates the disk 10a whilst operating the guard button 27a, the part of his body in the direction of rotation is set as a defended area. In other words, the right half of the body is defended when the disk is rotated to the right, and the left half of the body is defended when it is rotated to the left. The same applies to operations corresponding to the buttons 25b–27b and disk 10b. Furthermore, 28a and 28b are circular display sections, which display the state of the game. These are located in corresponding positions in virtually the centre of the game machine main unit. These display sections 28a, 28b are described below.

As described above, two sets of each section illustrated in FIG. 2 are provided. Here, the reading section 21a, buttons 25a–27a, and display 28a form side 1P, and reading section 21b, buttons 25b–27b and display section 28b form side 2P. If two players compete against each other ("2P mode"), then one player competes using side 1P and the other player competes using side 2P. Furthermore, if a single player is competing against a program in the game machine main unit 20 ("1P mode"), then the player competes using the 1P side.

Figure 3:
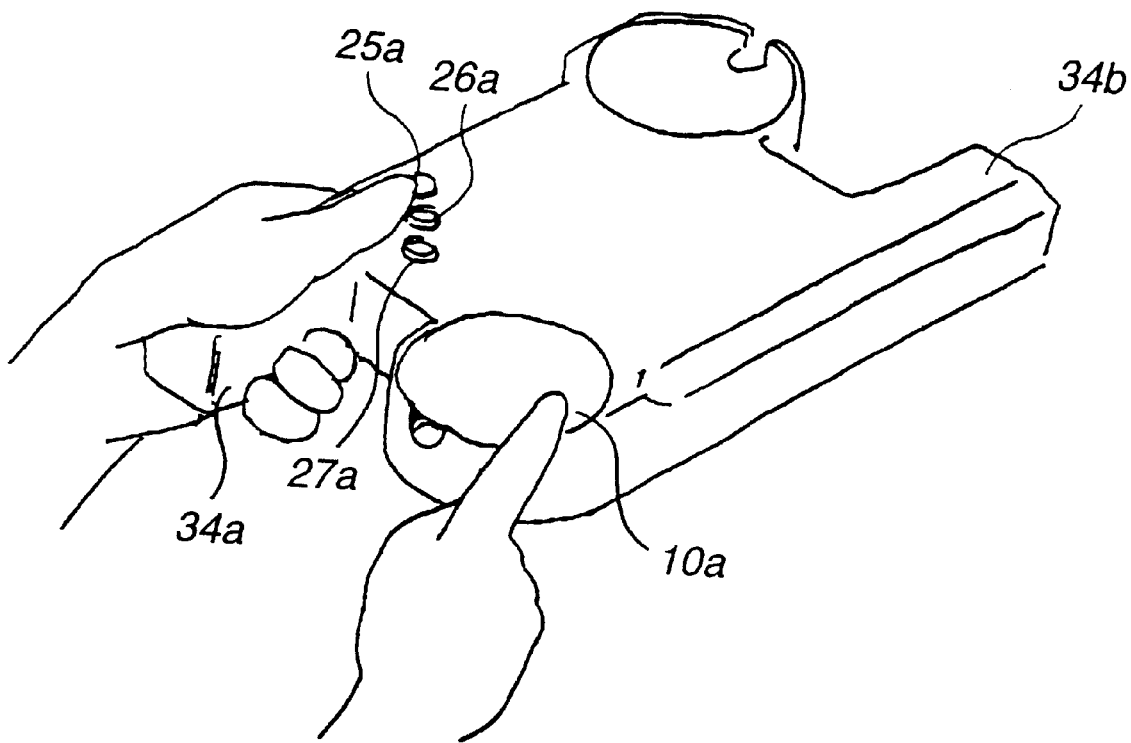
FIG. 3 is a diagram showing a state where a user is holding and operating the game machine main unit 20 according to this mode of implementation.

The game machine main unit 20 is also provided with a power switch 32 for turning on the power supply, and a mode select switch 33 for switching between the aforementioned "1P mode" and "2P mode". Holding sections 34a, 34b, which are held by the player with his or her left hand, are provided on the left-hand side of either end of the game machine main unit 20. These serve to stabilize the game machine main unit 20 when a player is holding the game machine main unit 20 whilst playing the game. In other words, as shown in FIG. 3, a player holds the holding section 34a and operates the buttons 25a–27a with his or her thumb. By holding this holding section 34a, 34b, it is possible to stabilize the game machine main unit 20 even if a relatively strong downward force is applied when rotating the disk 10a.

Figure 4A:
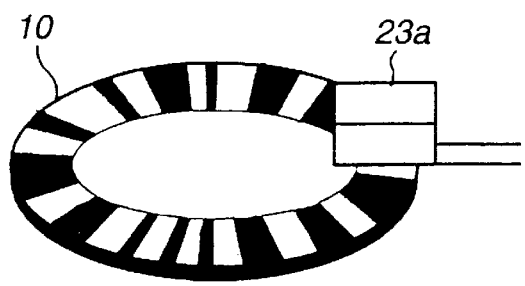
FIG. 4(a) illustrates a method of reading a barcode on a disk 10 according to this mode of implementation.

Next, a barcode reading method using the code sensor 23a provided in the aforementioned reading section 21a (the same applies to 21b) is described. FIG. 4 shows an example of a reading method. The code sensor 23a detects the thickness of each bar of a barcode.

Figure 4B:
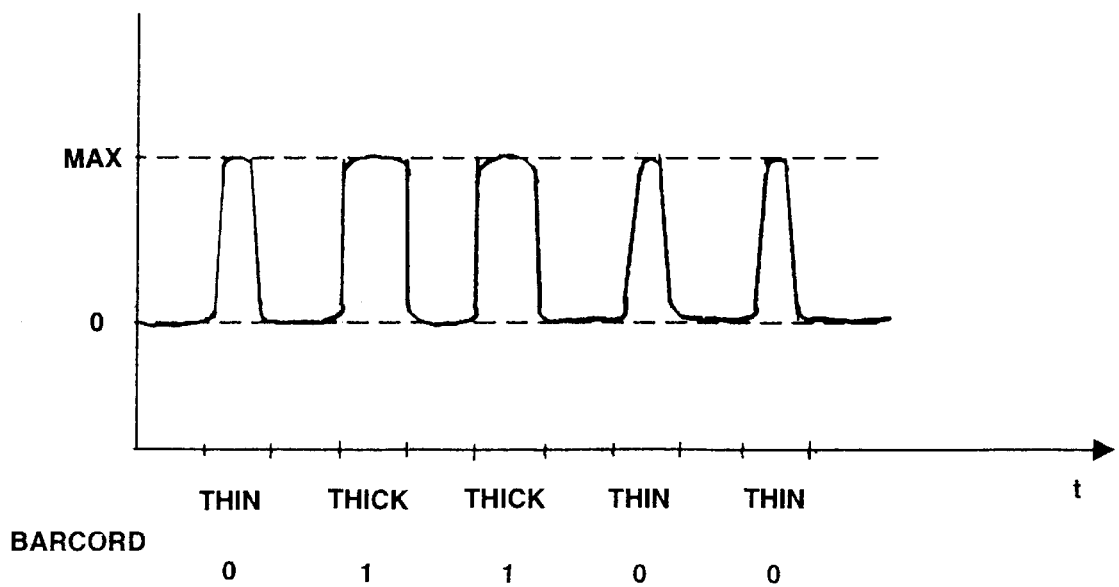

Consequently, when the code sensor 23a detects a thin bar, as illustrated in FIG. 4(b), it outputs a short signal, and when it detects a thick bar, it outputs a long signal. These are read into the control section, which is described below, and a code is derived on the basis of the lengths of these signals. In other words, when a short signal is output, "0" is derived, and when a long signal is output, "1" is derived.

Figure 5A:
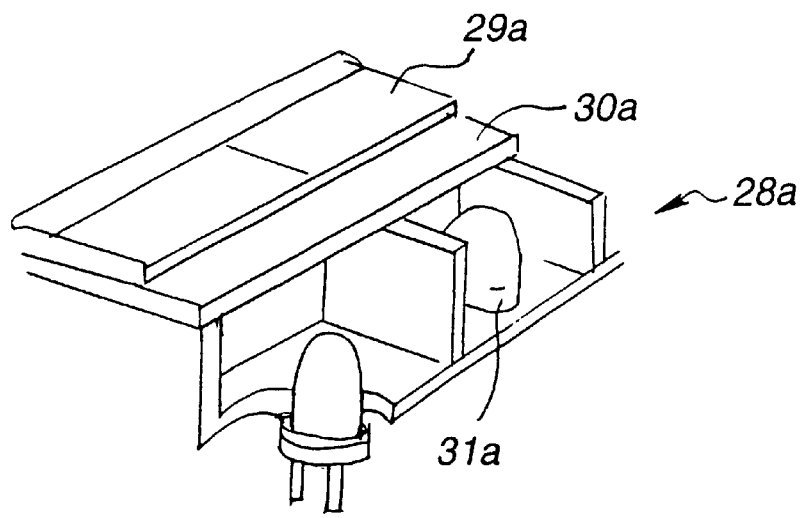
FIG. 5(a) shows the internal composition of a display section 28a according to this mode of implementation.
Figure 5B:
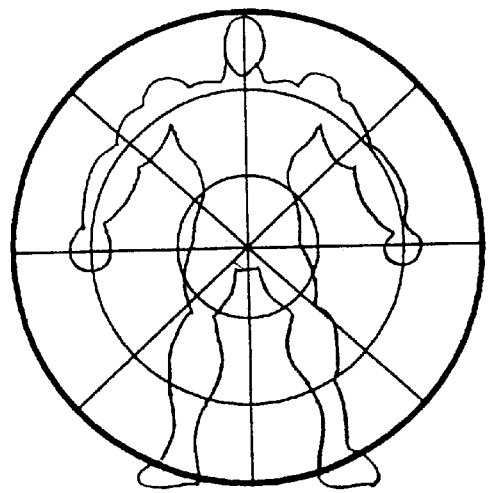

Next, the aforementioned display section 28a will be described (same applies to display section 28b). FIG. 5(a) shows the internal composition of this display section 28a (same applies to display section 28b); and FIG. 5(b) shows the surface of a display section 28a. As shown in FIG. 5(a), a transparent sheet 29a is placed on the surface of the display section 28a. Furthermore, an LED 31a is placed below the transparent sheet 29a via a semi-transparent sheet 30a. The light of the LED 31a is diffused by the aforementioned semi-transparent sheet 30a.

Figure 5C:
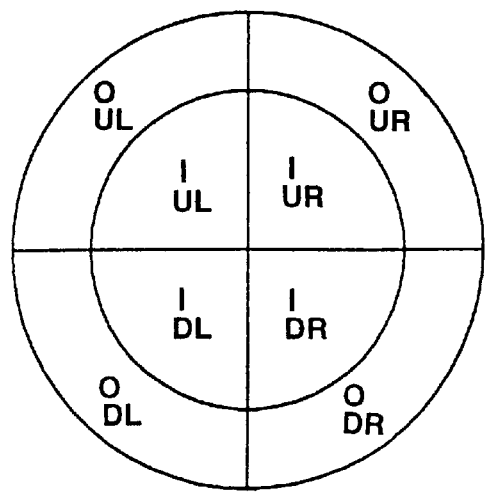

As shown in FIG. 5(b), the outline of a human figure is drawn on the aforementioned transparent sheet 29a. Two concentric circles and lines dividing these are drawn on the circular transparent sheet 29a. The surface of the display section 28a is divided by these circles and lines as illustrated in FIG. 5(c). Namely, it is divided into: an inner upper right area $I_{UR}$, upper left area $I_{UL}$, down right area $I_{DR}$, and down left area $I_{DL}$, and an outer upper right area $O_{UR}$, upper left area $O_{UL}$, down right area $O_{DR}$, and down left area $O_{DL}$. Eight of the aforementioned LEDs 31a are provided in positions corresponding to the 8 areas described above. Of these, the upper right areas $I_{UR}$, $O_{UR}$ correspond to the "right hand" of the figure shown in FIG. 5(b), the upper left areas $I_{UL}$, $O_{UL}$ correspond to the "left hand", the down right areas $I_{DR}$, $O_{DR}$ correspond to the "right foot", and the down left areas $I_{DL}$, $O_{DL}$ correspond to the "right foot". When an attack command as described above is input, the LED 31a in the outer area corresponding to that attack command lights up. Furthermore, when an attack is received, the LED 31a in the inner area corresponding to the position which receives the attack lights up.

For example, if a player makes a "right punch" attack, then the area $O_{UR}$ lights up on the attacking side. At the same time, damage is inflicted on the "left hand" of the opponent, and therefore the area $I_{UL}$ of the opponent lights up.

Furthermore, the LEDs 31a corresponding to each inner area $I_{UR}$, $I_{UL}$, $I_{DR}$, $I_{DL}$, are red-coloured LEDs, and the LEDs 31a corresponding to each outer area $O_{UR}$, $O_{UL}$, $O_{DR}$, $O_{DL}$, are green-coloured LEDs.

(Internal Composition)

Next, the internal composition of the game machine main unit 20 is described. FIG. 6 is a block diagram showing the composition of the aforementioned game machine main unit 20. In this diagram, signals indicating the codes on the disks 10a, 10b and their direction of rotation, as detected by code sensors 23a, 23b, and signals indicating the operation of buttons 25a–27a, 25b–27b, are input to the control section 40.

A mode selector switch 33 is connected to this control section 40, and a signal indicating the mode selected by the mode selector switch 33 is input thereto. The control section 40 is also connected to LEDs 31a, 31b in the display sections 28a, 28b, and the control section 40 switches these on and off in accordance with the development of the game. An LED driver which controls the LEDs 31a, 31b may also be provided independently of the control section 40, the control section 40 being set such that it outputs only timing signals to this LED driver.

The control section 40 is also connected to an originating circuit 41, which supplies timing signals to the control section 40 at prescribed intervals.

A sound synthesizer IC 42 and a sound amplifier 43 are connected to this control section 40. The control section 40 outputs sound signals, comprising sounds for a countdown immediately prior to a fight, or sounds generated in association with a display on the display sections 28a, 28b on the initial screen, etc., to a sound amplifier 43. The sound synthesizer IC 42 stores sound signals corresponding to "punch", "kick", and "trick", and when an attack is made, it generates a sound signal in accordance with a control signal from the control section 40. The sound amplifier 43 receives sound signals from the control section 40 or sound synthesizer IC 42, and drives a speaker 44 to generate sounds required for game development or results display. This speaker 44 is positioned in the game machine main unit 20 shown in FIG. 2(a) such that sounds are produced from the rear face thereof.

The control section 40 comprises: a CPU 45, ROM 46, RAM 47, parameter generating section 48, and a result determining section 49. The CPU 45 determines codes on the basis of signals input by the code sensors 23a, 23b. As described previously, a signal input from the code sensors 23a, 23b will be a signal as shown in FIG. 4(b), for example, and data values of "0" or "1" will be determined according to the length of the signal.

Furthermore, during a contest, the CPU 45 reads out and executes a program stored on the ROM 46 on the basis of the control information, and the like, input from the code sensors 23a, 23b, and buttons 25a–27a, 25b–27b. In this case, the CPU 45 processes the information input from the code sensor 23a and buttons 25a–27a on side 1P, and the information input from the code sensor 23b and buttons 25b–27b on side 2P, on the basis of the order in which they are input.

Here, a method for detecting the direction of rotation of a disk 10 by means of the CPU 45 is described. Firstly, prior to the start of a contest, the players insert disks 10a, 10b into reading sections 21a, 21b, and by turning them once the codes on the disks 10a, 10b are read out by the code sensors 23a, 23b. The CPU 45 records the read codes in the RAM 47.

Thereupon, when code is read by the code sensors 23a, 23b during a contest, the machine searches for the start bits STB amongst this code. The data contained between these start bits STB is then extracted as code. This code is compared to the codes stored prior to the start of the game, and if they are in the same forward direction, then a rightward rotation is derived, and if they are in opposite directions, then a leftward rotation is derived. Table data indicating the correspondences between codes and parameters is stored in the ROM 46. FIG. 7 shows examples of this table data. FIG. 7(a) is an example of a character data table corresponding to the code on a disk 10.

"Code" indicates the corresponding disk type.

"Life points" are allocated to the four regions shown in FIG. 5(c) (areas $I_{UR}$, $I_{UL}$, $I_{DR}$, $I_{DL}$). When a character receives an attack from an opponent, points are deducted according to the damage inflicted, and when this value is "0" for all four regions, the character has lost.

"Punch" is an upper body means of attack (right punch, left punch), in other words, it is allocated to the two upper regions shown in FIG. 5(c) (areas $O_{UR}$ and $O_{UL}$). This value indicates the strength of the attack inflicted on the opponent by a right punch and left punch.

"Kick" is a lower body means of attack (right kick, left kick), in other words, it is allocated to the two lower regions shown in FIG. 5(c) (areas $O_{DR}$ and $O_{DL}$). This value indicates the strength of the attack inflicted on the opponent by a right kick and left kick.

"Guard" indicates the force by which the attacking force received from an opponent is reduced, and it is allocated to an area which is set to be defended during the contest. When an attack is received in that area, the damage inflicted by that attack is reduced in accordance with this defensive strength.

"Skill 1": Type 1 of special trick which can be produced

"Skill 2": Type 2 of special trick which can be produced

"Skill 3": Type 3 of special trick which can be produced

FIG. 7(b) shows a trick data table relating to tricks.

"Code" indicates the type of trick.

"Generating command sequence" indicates the combination of commands required to generate that trick. "PR"= "right punch";

"PL"="left punch"; "KR"="right kick"; and "KL"="left kick".

"Attack position" indicates the positions where an attack is directed on the opponent by the trick. An attack is directed at a plurality of positions by a single trick.

"Force" indicates the attacking force applied to the attacked positions of the opponent by the trick.

The CPU 45 reads out data corresponding to the code from the aforementioned character data table on the basis of the code read in by the code sensors 23a, 23b. Furthermore, the parameter generating section 48 sets parameters, such as ability, available tricks, etc. relating to the character in question on the basis of the data read out by the CPU 45.

Furthermore, a command recording region, where input commands are written successively, is provided in the RAM 47, and the CPU 45 refers to the previously written commands. By comparing a command sequence written to this command recording region with the "Generating command sequences" in the aforementioned trick data table, the CPU 45 determines whether or not a trick is produced. When the CPU 45 is set to "1P mode", it reads out and executes a program from the ROM 46 to act as side 2P. In concrete terms, random numbers are generated by running a random generating routine, and attack commands or defence commands etc. are determined according to these numbers. In other words, a table containing the random numbers generated by the random generating routine and the commands corresponding to these respective random numbers is stored beforehand, and when a random number in a particular range is generated, it is considered that the corresponding command has been given.

For example, in the case of a random generating routine producing random numbers in the range "0–15", the commands may be specified as follows. If the random number is "0–2", then "right punch" is specified, if "3–5", then "left punch", if "6–8", then "right kick", if "9–11", then "left kick", if "12–13", then "right defence", and if "14–15", then "left defence".

Furthermore, the victory determining section 49 monitors the "life points" of each part on both side 1P and side 2P, and it judges any side where all "life points" have reached "0" to be the loser.

(3) Operation and Advantages

Next, the operation of a game machine according to the present mode of implementation is described with reference to flowcharts.

(3-1) Initial Processing

Figure 8:
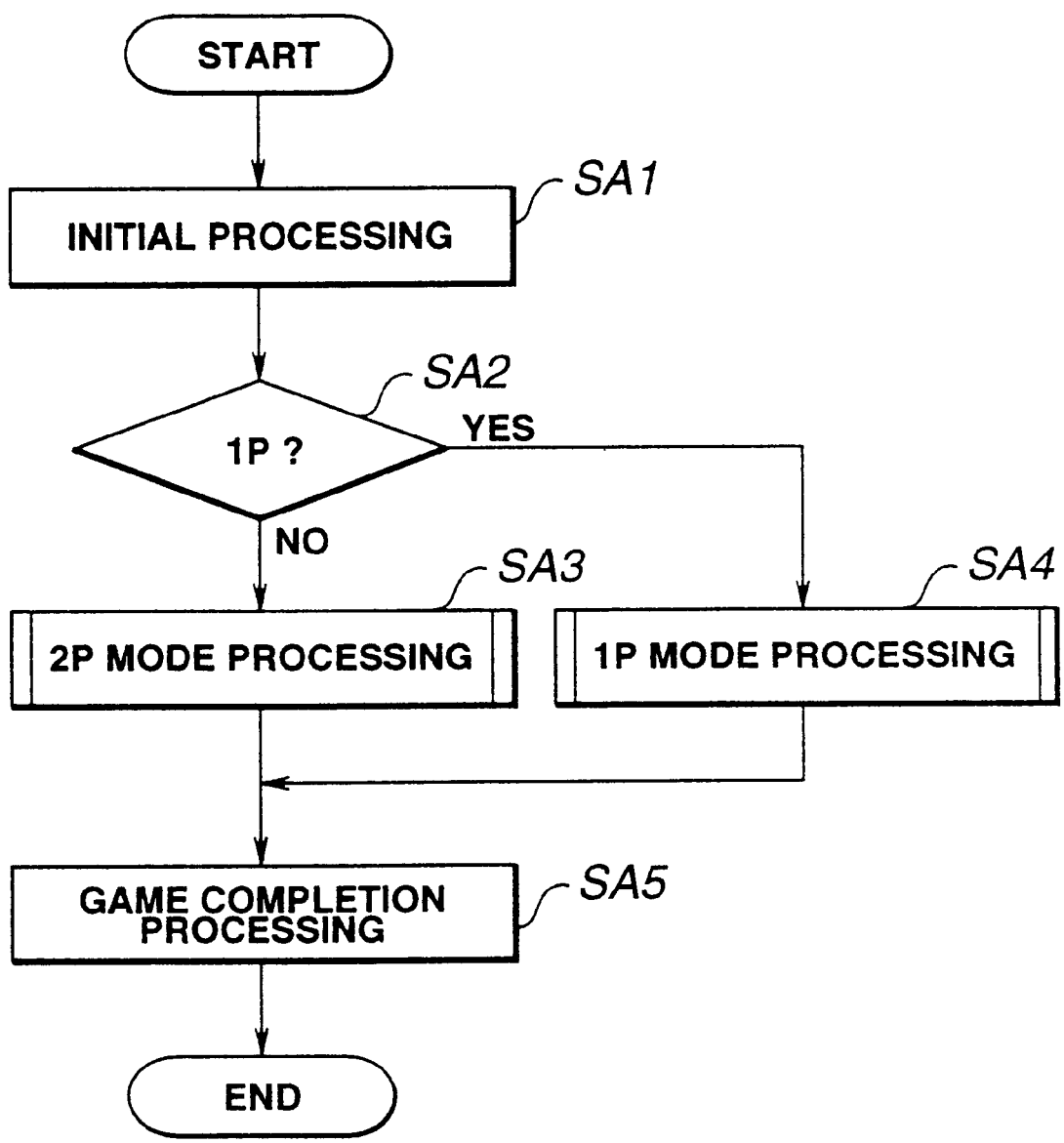
FIG. 8 is a flowchart showing the processing implemented by CPU 45 in this mode of implementation.

Firstly, in FIG. 8, when the player turns the power switch 32 on, the CPU 45 reads out a program from the ROM 46 and executes initial processing (step SA1). In concrete terms, display processing is carried out for the display sections 28a, 28b, and sound signals are output to the sound amplifier 43. For example, in the display sections 28a, 28b on side 1P and side 2P, the inner areas $I_{UR}$, $I_{UL}$, $I_{DR}$, $I_{DL}$ and the outer areas $O_{UR}$, $O_{UL}$, $O_{DR}$, $O_{DL}$ shown in FIG. 5(c) are flashed on and off alternately, whilst sound effects, such as a beeping noise, are produced from the speaker 44.

(3-2) Mode Selection Processing

Next, a mode selector switch 33 is operated by a player to select either "2P mode" or "1P mode" (step SA2). The CPU 45 runs 2P mode processing (step SA3) if the player selects "2P mode", and it runs 1P mode processing (step SA4) if the player selects "1P mode". The processing in the respective modes is described below.

(3-3) 2P Mode Processing

Firstly, a case where the player selects "2P mode" is described.

Figure 9:
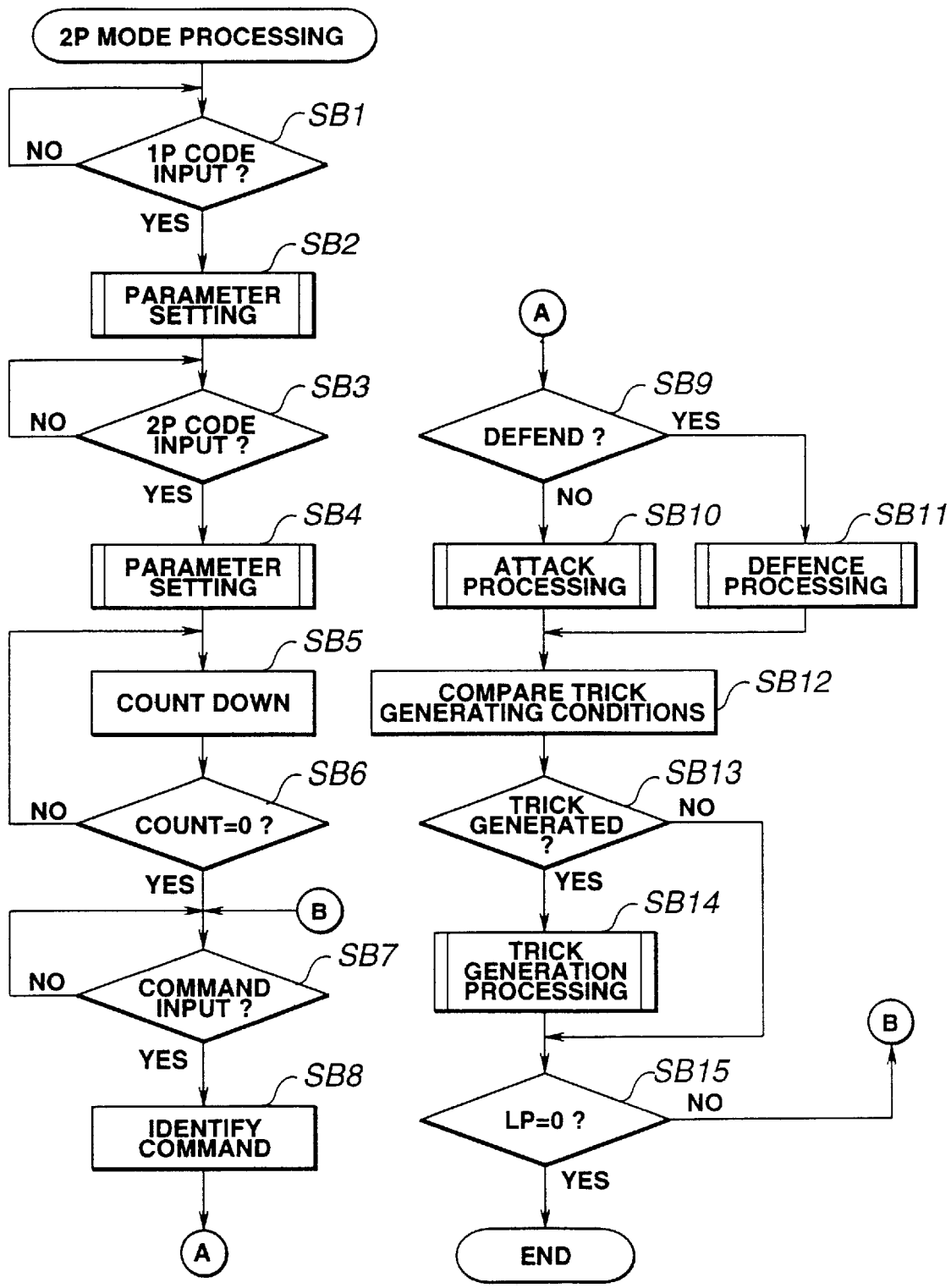
FIG. 9 is a flowchart showing the processing implemented by CPU 45 in this mode of implementation.

FIG. 9 illustrates a specific processing sequence for "2P mode processing" in the aforementioned step SA3.

If "2P mode" is selected in this way, the device enters a standby state for code input from the disks 10a, 10b (step SB1). During this time, the CPU 45 causes the inner areas $I_{UR}$, $I_{UL}$, $I_{DR}$, $I_{DL}$ on the display screen 28a, 28b on side 1P and side 2P to flash on and off, thus generating a display encouraging the player to input commands. Here, it shall be assumed that the player on side 1P inputs code first. Namely, the player on side IP sets a disk 10a in the reading section 21a shown in FIG. 2(a), and causes the disk to rotate once using his or her fingers, as depicted in FIG. 2(b). Thereby, the barcode marked on the disk 10a is read out by the code sensor 23a. The parameters are set on the basis of the barcode read out (step SB2).

Next, the player on side 2P sets a disk 10b in the reading section 21b and similarly causes the disk 10b to rotate using his or her fingers (step SB3), and the barcode on the disk 10b is read out by the code sensor 23b. Parameters are then set on the basis of the barcode read out (step SB4). This code input does not necessarily have to be input in the order side 1P ->side 2P, but may also be conducted in the order side 2P ->side 1P.

(Parameter Setting Process)

FIG. 10 illustrates the parameter setting processes in steps SB2 and SB4 mentioned above. Firstly, the CPU 45 identifies the code in the barcode read out by code sensor 23a or 23b (step SC1). It then reads corresponding data from a character data table in the ROM 46 on the basis of this code (step SC2). This data is then supplied to a parameter generating section 48, which sets parameters for the relevant character on the basis of the data (step SC3).

For example, a barcode indicating "code 1" is marked on the disk 10a on side 1P, and a barcode indicating "code 2" is marked on the disk 10b on side 2P. Here, the CPU 45 reads out all the data corresponding to "code 1" in the character data table. The read out data is supplied to the parameter setting section 48, which sets parameters on the basis of this data. On side 2P, parameters are set in a similar manner using data corresponding to "code 2".

Figure 11A:
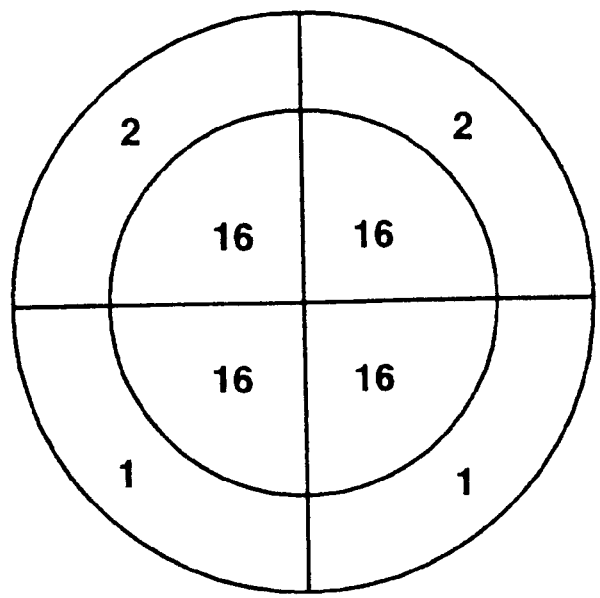
FIG. 11 shows conceptual diagrams of the settings of parameters on (a) side 1P and (b) side 2P.
Figure 11B:
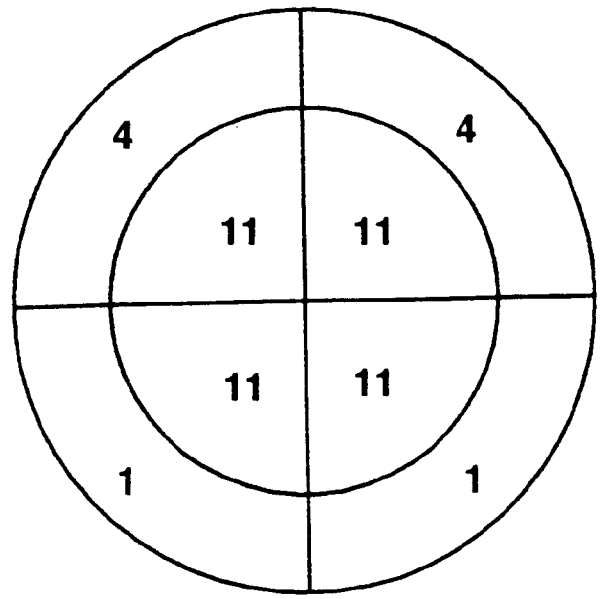

FIG. 11 gives conceptual views of parameter settings when the parameters have been set on both side 1P and side 2P. These diagrams correspond to the diagrams in FIG. 5(c), and FIG. 11(a) shows the settings on side 1P and FIG. 11(b) shows the settings on side 2P. In FIG. 11, the life points on the disk 10 are set for the inner areas $I_{UR}$, $I_{UL}$, $I_{DR}$, $I_{DL}$ and attack forces for attack commands using the relevant body part are set for the outer areas $O_{UR}$, $O_{UL}$, $O_{DR}$, $O_{DL}$. For example, the punching power on side 1P is "2" and the kick power is "1".

(Starting Contest)

Returning to FIG. 9, the CPU 45 starts a countdown from a count number of "4" in accordance with a timing signal from the originating circuit 41 (step SB5). In this case, a beeping sound is produced from the speaker 44 at the timing of the aforementioned timing signal. At the same time, the four inner areas $I_{UR}$, $I_{UL}$, $I_{DR}$, $I_{DL}$ of the display section 28a, 28b shown in FIG. 5(c), are lit up successively in a clockwise direction. When the count reaches "0" (step SB6), finally, a long "beep" sound is produced, whereupon the device enters a command standby state (step SB7).

One of the players inputs a command by rotating disk 10a or 10b whilst simultaneously operating buttons 25a–27a or 25b–27b (step SB7), and the CPU 45 identifies the content of this command (step SB8). As a result, when a player has operated a punch button 25a, 25b or kick button 26a, 26b (step SB9), attack processing is implemented (step SB10). Furthermore, when a player has operated the guard button 27a, 27b (step SB9), defence processing is implemented (step SB11).

(Attack Processing)

Figure 12:
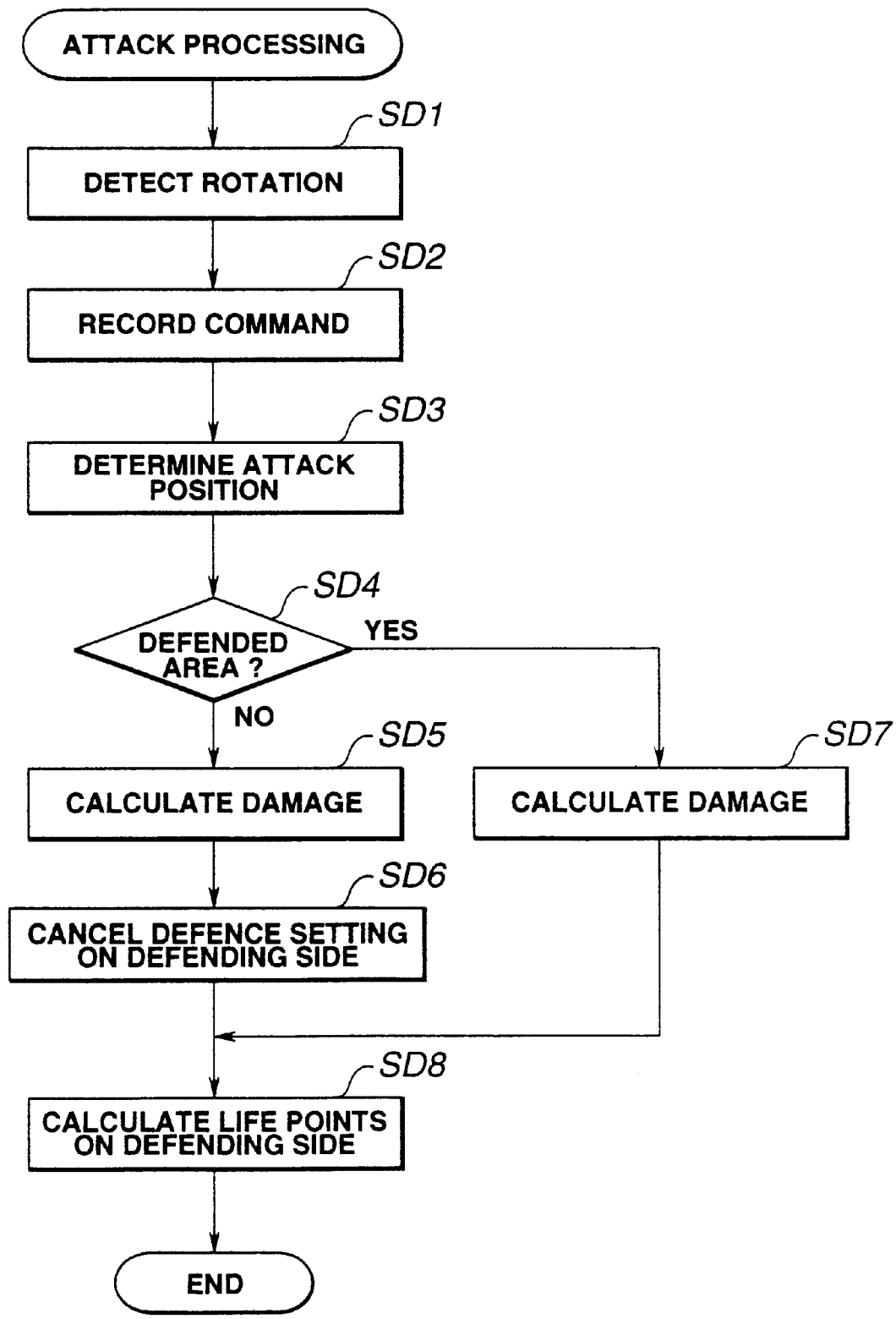
FIG. 12 is a flowchart showing the processing implemented by a CPU 45 in this mode of implementation.

FIG. 12 shows a concrete processing sequence for attack processing in the aforementioned step SB10. Here, a case is described wherein the player on side P1 conducts an attack. Firstly, when the code sensor 23a detects that the disk 10a has been rotated, the CPU 45 detects the direction of rotation of the disk 10a (step SD1). Next, the input command is written to the command recording region in the RAM 47 based on the type of button detected in the aforementioned step SB8 (kick or punch) and the direction of rotation of the disk 10 (step SD2). For example, if the player rotates the disk 10a to the right whilst operating a punch button 25a, an attack command comprising a "right punch" is recorded.

Next, the attacked position on the opponent is determined on the basis of the aforementioned attack command (step SD3). For example, if the attack command is a "right punch", then the attacked position on the opponent will be "left hand". Furthermore, in this case, the position indicated by the attack command on the display section 28a on the attacking side lights up. For example, if the attack command is "right punch", then the outer upper right area $O_{UR}$ of the display section 28*a* lights up. In this case, the CPU 45 issues a sound signal corresponding to the attack to the sound synthesizer IC 42. For example, in the case of a "right punch", a sound signal corresponding to a "punch" is generated. Thereby, an attack sound corresponding to "punch" is produced from the speaker 44 via the sound amplifier 43.

It is then determined whether or not defence is set in the corresponding attacked position of the opponent (step SD4), and the damage to the other party is calculated accordingly. In other words, if a defence is set in the attacked position, then the damage on the defending side is set to a value obtained by subtracting the defensive force of the defending side from the attacking force of the attacking side (step SD5). The defensive setting of the defending side is then cancelled (step SD6). Furthermore, if a defence is not set in the attacked position, then the defensive side is damaged directly by the attacking force of the attacking side (step SD7).

By inputting commands as described above, an attack is made. The details of this attack are displayed on the display screens 28*a*, 28*b*. Namely, LEDs 31*a*, 31*b* corresponding to the part where the attack is made light up. For example, if side 1P executes a "right punch", then the area corresponding to the right hand in the diagram marked on the surface of the display section 28*a* lights up. Correspondingly, on display section 28*b*, the left hand region, where the opponent is damaged, lights up.

The CPU 45 then calculates the life points on the defending side (step SD8). In other words, it takes the current life points value for the region which has been attacked and it subtracts the damage value derived in step SD5 or step SD7 to give a new life points value.

Here, an example is described which involves parameter settings on side 1P and side 2P, as shown in FIG. 11. For example, it is supposed that side 1P inflicts a "right punch" on side 2P (attacking force "2"). If side 2P is set to defence on the left half of the body (defensive force "2"), then the damage to side 2P will be "0". However, if side 2P has not been set to defence on the left half of the body, then the damage to side 2P will be "2". This is subtracted from the upper left life points value of "11" to give an upper left life points value of "9" on side 2P.

(Defence Processing)

Figure 13:
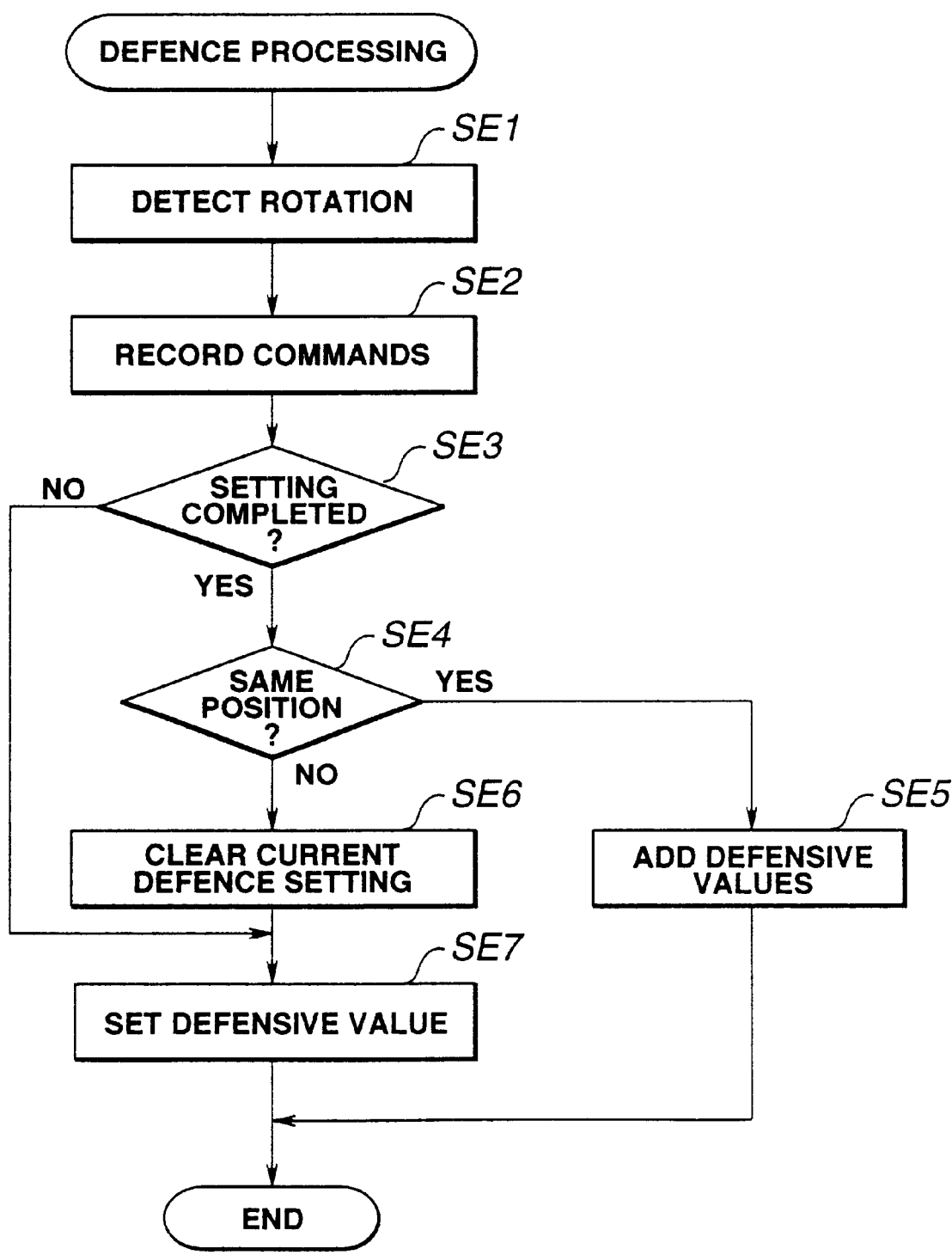
FIG. 13 is a flowchart showing the processing implemented by a CPU 45 in this mode of implementation.

FIG. 13 shows a concrete processing sequence for defence processing in step SB11 shown in FIG. 9. Here, a case where the player on side 2P makes a defence is described. Firstly, similarly to attack processing, the code sensor 23*b* detects rotation of the disk 10*b*, and the CPU 45 detects the direction of rotation of the disk 10*b* (step SE1). An input defence command, derived from the type of button detected at step SB8 and the direction of rotation of the disk 10, is written to the command recording region in the RAM 47 (step SE2). For example, if the player rotates the disk 10*b* to the right, then the command "set defence on right half of body" is recorded, and if the player rotates it to the left, the command "set defence on left half of body" is recorded.

Next, it is determined whether or not a defence setting has already been made (step SE3), and if a defence has been set, then it is determined whether or not the position of that setting is the same as the new defence setting (step SE4). If the position is the same, then the new defence value is added to the previous defence value (step SE5). If it is not the same, then the previous defence setting is cleared (step SE6), and the defence value is set in the new setting position (step SE7). In other words, when a defence has already been set on the "right body half", then if a further command to set a defence on the "right body half" is input, the defence values for the "right body half" will be added together directly. On the other hand, if a command to set a defence on the "left body half" is input, then the defence set previously for the "right body half" will be cancelled and a new defence will be set on the "left body half".

If no defence setting has previously been made (step SE3), then the defence value is set in the new setting position in a similar manner (step SE7).

(Trick Generation Processing)

In FIG. 9, after executing attack processing (step SB10) or defence processing (step SB11) as described above, the CPU 45 refers to the trick data table, on the basis of the commands written thus far to the command recording region of the RAM 47 (step SB12). It determines whether or not the conditions for generating a trick have been matched (step SD13). In other words, it judges whether or not the combination of commands implemented thus far match a generating command sequence for an available trick.

For example, let it be supposed that, on side 1P, the sequence "right punch ->right punch ->right punch ->right punch" is recorded in the command recording region, and the available tricks set for side 1P are the code 1 trick, code 2 trick, and code 5 trick shown in FIG. 7(*b*). In this case, the aforementioned "generating command sequence" for each of these tricks is compared with the aforementioned recorded commands. As a result, it is determined that the recorded commands are the same as the "generating command sequence" for code 1.

Figure 14:
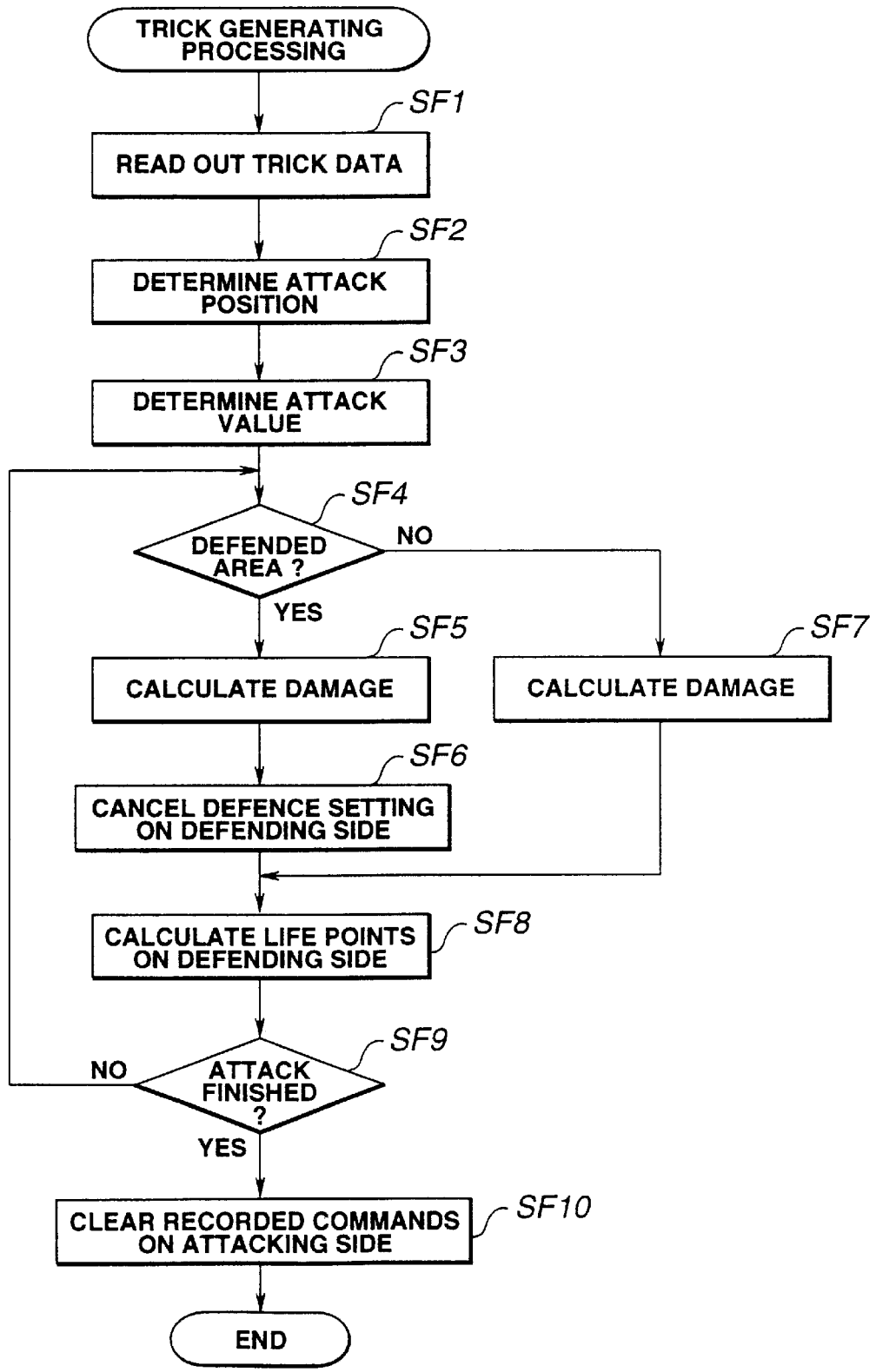
FIG. 14 is a flowchart showing the processing implemented by a CPU 45 in this mode of implementation.

Thus, when the conditions for generating a trick are matched, trick generation processing is implemented (step SB14). Below, the specific processing involved in generating a trick is described. FIG. 14 is a flowchart of trick generation processing. Firstly, the CPU 45 reads out trick data, namely, "attack region" and "power" data from the trick data table (step SF1). It then determines the position of the attack on the basis of this trick data (step SF1). For example, in the case of the code 1 trick, the "attack region" is "upper right" and "upper left", so the attacked positions on the defending side will be "left hand" and "right hand". In this case, the positions on the attacking side display section 28*a* or 28*b* corresponding to the aforementioned attack regions are lit up. At the same time, the CPU 45 transmits a sound signal corresponding to the aforementioned trick to the sound synthesizer IC 42. Thereby, an attack sound corresponding to the "trick" is produced from the speaker 44.

Furthermore, an attack value is determined on the basis of the trick data (step SF3). In the case of the code 1 trick, for instance, the number "5" indicating "power" will form the attack value. Firstly, it is determined whether or not the defending side has set a defence (step SF4), and the damage is then calculated accordingly. Specifically, if it has set a defence in the attack region, then the damage to the defending side is given by a value obtained by subtracting the defensive force from the attack value (step SF5). The defence setting on the defending side is then cancelled (step SF6). On the other hand, if no defence has been set in the attack region, then the damage to the defending side is given directly by the attack value (step SF7).

Thereupon, the life points on the defending side are calculated (step SF8), and it is determined whether or not the attack has finished (step SF9). If the "attack region" is different, then damage will be calculated for this region in the same way. In other words, in the case of the aforementioned code 1 trick, after the "left hand" of the defending side has been attacked, the damage to the "right" of the defending side is calculated.

If the defending side had previously set a defence, then since that defence setting is cancelled by the first attack, it is judged here that no defence is set (step SF4), and from the second attack region onwards the attack value is taken directly as the damage inflicted on the defending side (step SF7). In this way, when the attack is finished, the recorded commands on the attacking side are cleared (step SF1).

In the trick data table shown in FIG. 7(b), only attack commands are set in the "generating command sequence", but it is also possible to set tricks which contain defence commands. For example, let it be supposed that a trick is generated by the command sequence: "right punch ->right defence ->left punch ->left defence". In this case, when the defending side inputs the final defence command, a trick is performed by the defending side on the attacking side. Specifically, the side that was the defending side up to that point becomes the attacking side in this trick generating process and, conversely, it carries out an attack.

Here, attacks are made consecutively to the attack regions indicated by the trick data, but the attacks may also be made simultaneously. In other words, the damage calculation operations may be performed simultaneously.

(Monitoring Life Points)

Returning again to FIG. 9, when the trick generating processing has been carried out as described above, the result determining section 49 judges whether or not the life points for all the parts "right arm", "left arm", "right foot","left foot" have reached "0", for both side 1P and side 2P (step SB15). If both sides have reached "0" life points for all parts, the device assumes a standby state awaiting command input from the players (step SB7). If either side 1P or side 2P have reached "0" life points for all parts, then 2P mode processing ends.

(Game Completion Processing)

As described above, when the 2P mode processing ends as a result of playing a game, the game completion processing illustrated in FIG. 8 is implemented (step SA5). In other words, the player who has life points remaining is designated to be the winner and the player whose life points have all reached "0" becomes the loser. The display sections 28a, 28b display the result. For example, if side 1P has won, then the outer areas $O_{UR}$, $O_{UL}$, $O_{DR}$, $O_{DL}$ of the display section 28a on the winner's side and the inner areas $I_{UR}$, $I_{UL}$, $I_{DR}$, $I_{DL}$ of the display section 28b on the loser's side flash on and off alternately. As described above, the LEDs 31a, 31b corresponding to the inner areas are red, and the LEDs 31a, 31b corresponding to the outer areas are green, thereby making it easy to recognize which of the players is the winner.

At the same time, the CPU 45 generates a buzzer sound from the speaker 44 via the sound amplifier 43 to match the flashing of the LEDs. Thereupon, if the player operates any of the buttons 25a–27a on side 1P, then the software is reset and the device again assumes a standby state awaiting the input of the mode selector switch 33.

(3-4) 1P Mode Processing

Figure 15:
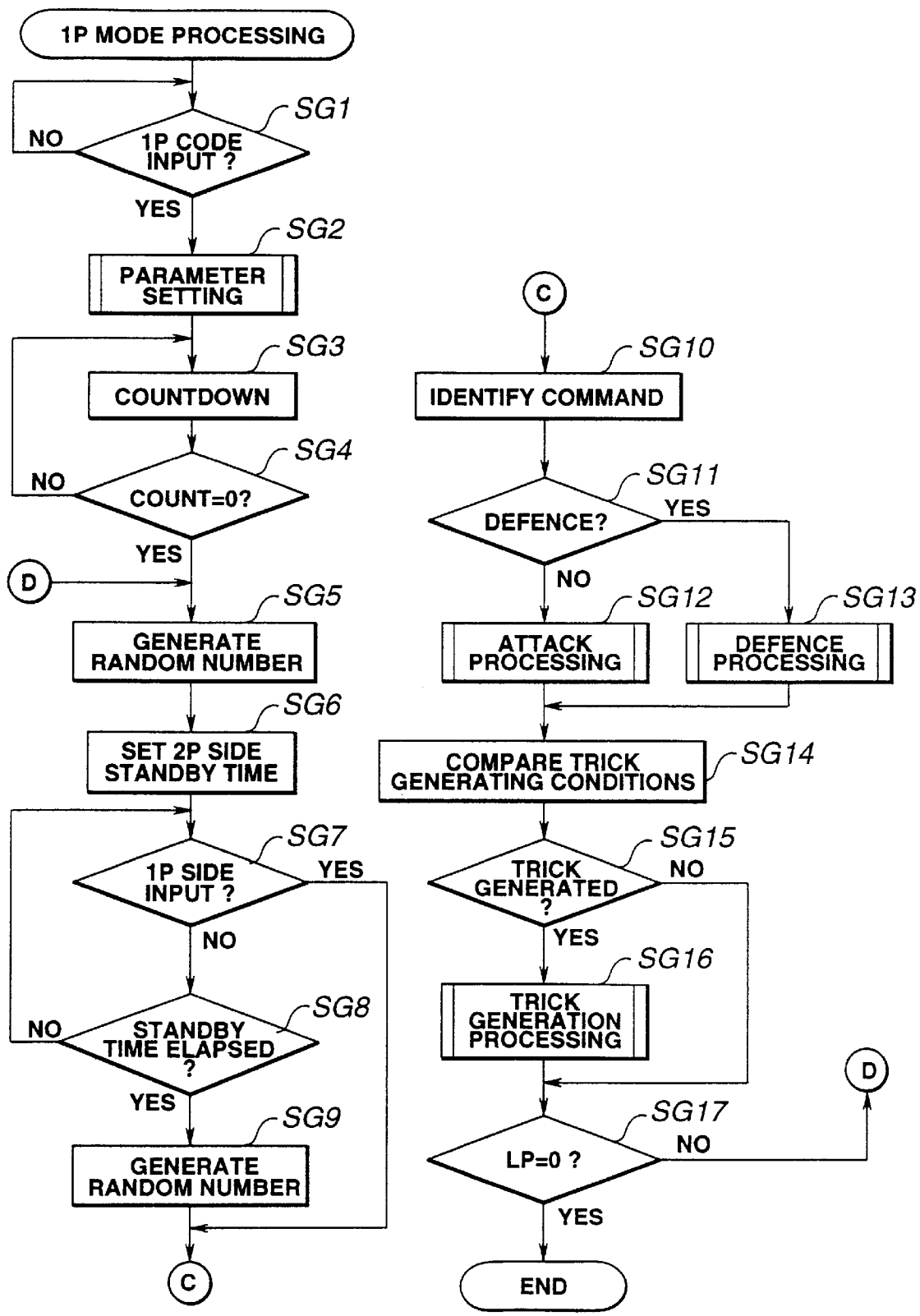
FIG. 15 is a flowchart showing the processing implemented by a CPU 45 in this mode of implementation.

Next, a case where the player selects "1P mode" is described. FIG. 15 shows a concrete processing sequence for "1P mode processing" in the aforementioned step SA4. If "1P mode" is selected as described above, the device assumes a standby state awaiting input of the code on the disk 10a by the player (step SG1). If the player then sets the disk 10a in the reading section 21a and rotates it once with his or her fingers, the CPU 45 conducts parameter setting processing similarly to 2P mode (step SG2). Thereupon, again similarly to 2P mode, a countdown is made (steps SG3, SG4).

The CPU 45 then executes the program in the ROM 46 (step SG5). This program includes a random generating routine for generating random numbers, and the CPU 45 sets the 2P side standby time according to this generated random number (step SG6). If a command is input from side 1P during this standby time (step SG7), then the content of the command input from side 1P is determined (step SG10).

Furthermore, if there has been no command input from side 1P within the standby time (step SG8), then the program in the ROM 46 is reimplemented (step SG9). This program contains the aforementioned random generating routine, and a command is specified according to the random number generated by this routine.

The CPU 45 then determines the content of the command specified in this way (step SG10).

The CPU 45 judges whether a command input by the player or generated by the program, as described above, is an attack command or defence command (step SG11). It then executes attack processing if it is an attack command (step SG12), and it executes defence processing if it is a defence command (step SG13). Similarly to 2P mode, this attack processing and defence processing are executed following the sequences illustrated in FIG. 12 and FIG. 13.

Also similarly to 2P mode, comparison is made to the trick generating conditions (step SG14), and if conditions are matched (step SG15), then trick generation processing is implemented (step SG16).

Thereupon, the result determining section 49 judges whether or not all life points have reached "0", for side 1P and the CPU 45 side (step SG17). If neither side has reached "0" for all parts, then the CPU 45 executes the random generating routine again (step SG5), and the 2P side standby time is set (step SG6). When either side 1P or the CPU 45 side has reached "0" life points for all parts, 1P mode processing ends.

Thereafter, game completion processing is implemented similarly to 2P mode.

According to the present invention, players can match their technique against each other by inputting commands by operating buttons 25a–27a and 25b–27b whilst simultaneously rotating the disk 10. Furthermore, it is also possible to generate tricks by a combination of commands, and therefore unforeseen game developments can be anticipated.

Moreover, since the size of the disk 10 is the same as a conventional "pog", it conveys the feeling of a "pog" game, and also allows games to be played which are more profound than "pog" games. Moreover, since the state of the contest is displayed by a plurality of LEDs, whilst sounds are generated simultaneously, it is possible to develop a game having a sense of urgency.

(4) Other Compositional Examples

In the aforementioned mode of implementation, a system wherein the player rotates the disk 10 directly using his or her fingers was adopted, but besides this it is also possible to use the following type of system.

Figure 16:
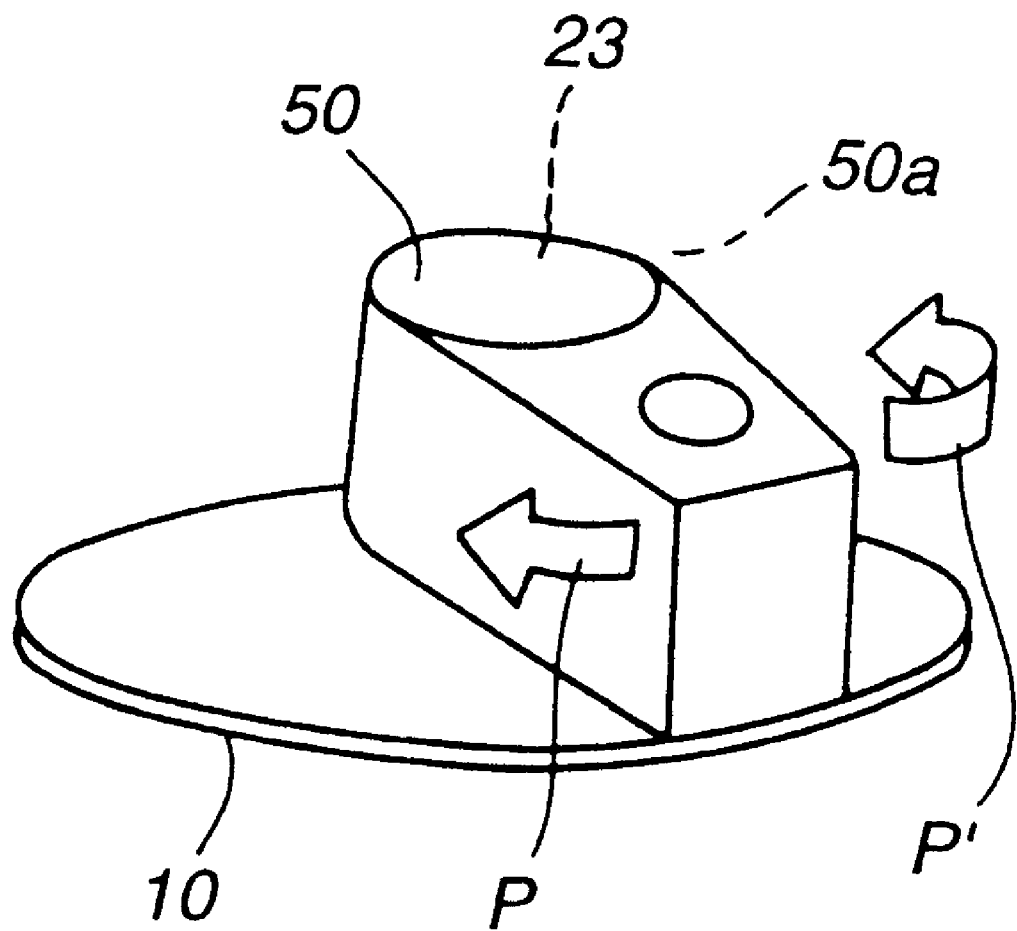
FIG. 16 is a diagram showing a further example of a reading section 21a in this mode of implementation.
Figure 17:
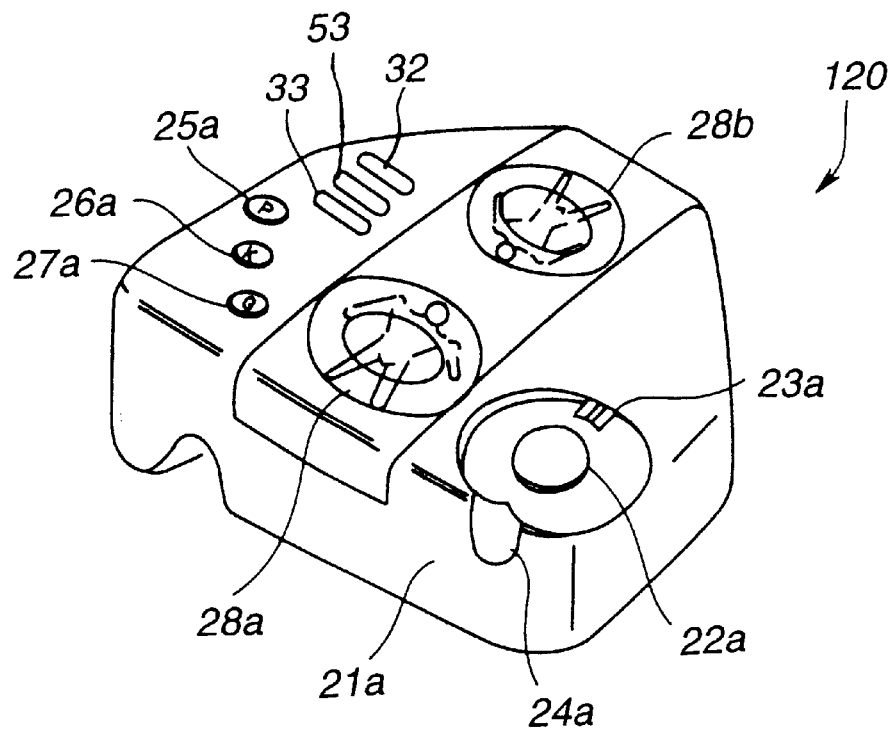
FIG. 17 is an oblique view showing the composition of a game machine main unit 120 according to a second mode for implementing the present invention.

Namely, as shown in FIG. 16, the code sensor 23 is placed in a housing 50, and the disk 10 is installed below this housing 50. The housing 50 is rotatable about axis 50a in the direction of the arrows P–P'. In this case, the disk 10 does not rotate. Thereupon, by rotating the housing 50 by hand, the player reads out the code on the disk 10.

In the aforementioned mode of implementation, there is only one set of barcode BC marked on the disk 10, but it is also possible to provide three sets of barcode BC on one circumference. In this case, commands can be input continuously by rotating the disk 10 once.

B. Second Mode of Implementation

(1) Composition

Figure 19:
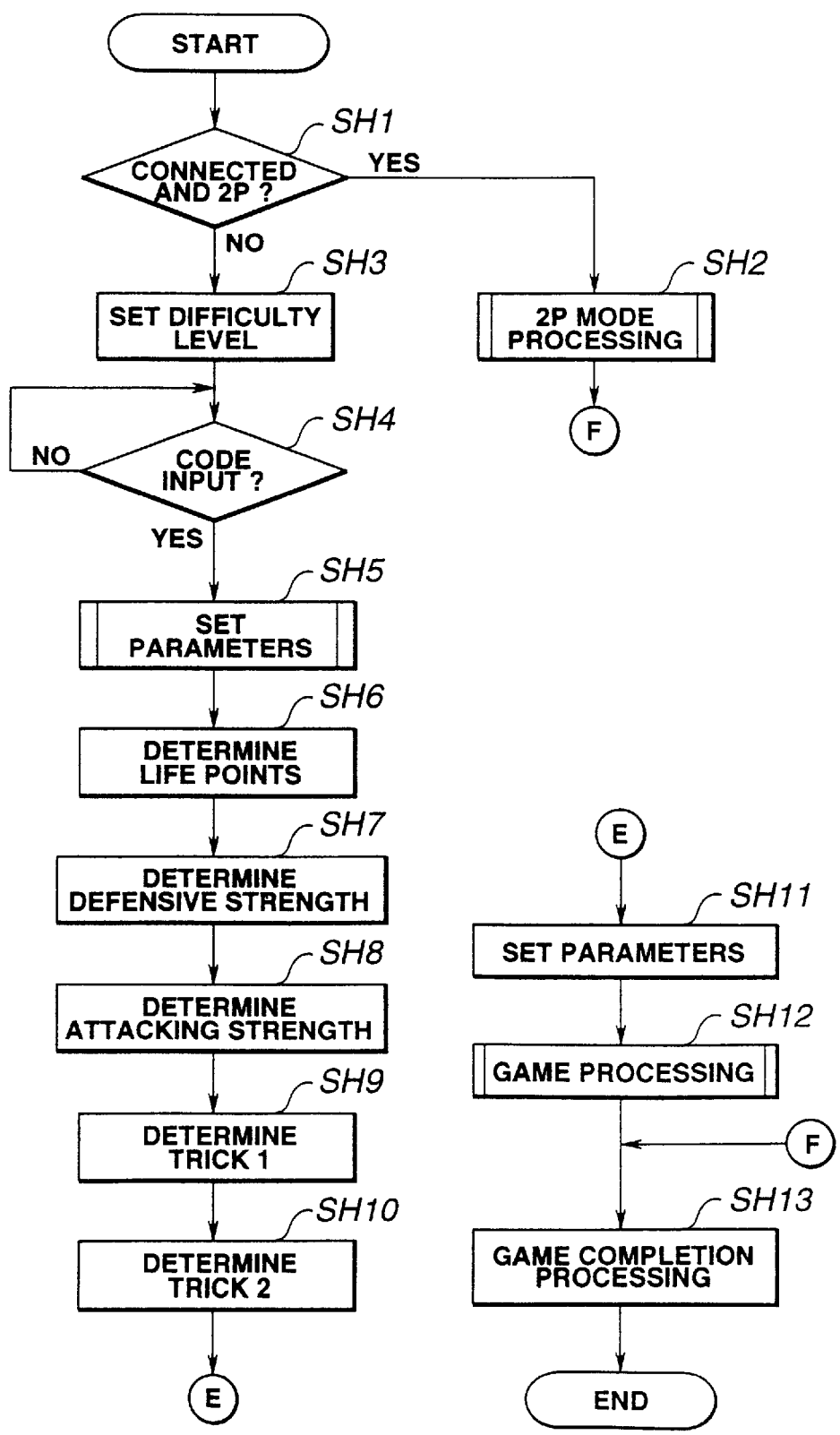
FIG. 19 is a flowchart illustrating processing implemented by a CPU in this mode of implementation.

Next, a game machine according to a second mode for implementing the present invention is described. FIG. 19 is an oblique view showing the external appearance of a game machine according to a second mode of implementation. The game machine main unit shown in the diagram is a one player-only game machine, which is capable of implementing only the 1P mode described above.

Similarly to the game machine main unit 20 illustrated in FIG. 2, the game machine main unit 120 comprises a reading section 21a, punch button 25a, kick button 26a, guard button 27a, display section 28a, and power switch 32.

A mode selector switch 33 is also provided in the game machine main unit 120. This switch is for switching between "1P mode" and "2P mode" when a plurality of game machine main units are connected. Specifically, in a state where a plurality of game machine main units 120 are connected, it switches between ("1P mode") where the player competes against the program in the game machine main unit 120, and ("2P mode") where a plurality of players compete against each other.

A difficulty level switch 53 is also provided in the game machine main unit 120. This difficulty level switch 53 is for selecting the strength of the character on the CPU side, and it sets a numerical value for difficulty according to the number of times it is operated. This difficulty level is represented by numerical values from "1" to "4", and if the difficulty level switch 53 is operated once, the difficulty level is set to "1", and if operated two times, the level is set to "2". Levels of "3" and "4" are set in a similar manner.

This difficulty level is used in the form of a numerical value when generating the character on the CPU side. When generating the character, the CPU runs a random generating routine. By adding the aforementioned difficulty level value to the random number generated by this routine, the life points, defensive strength, and punching and kicking attack force of the character are calculated.

Figure 18:
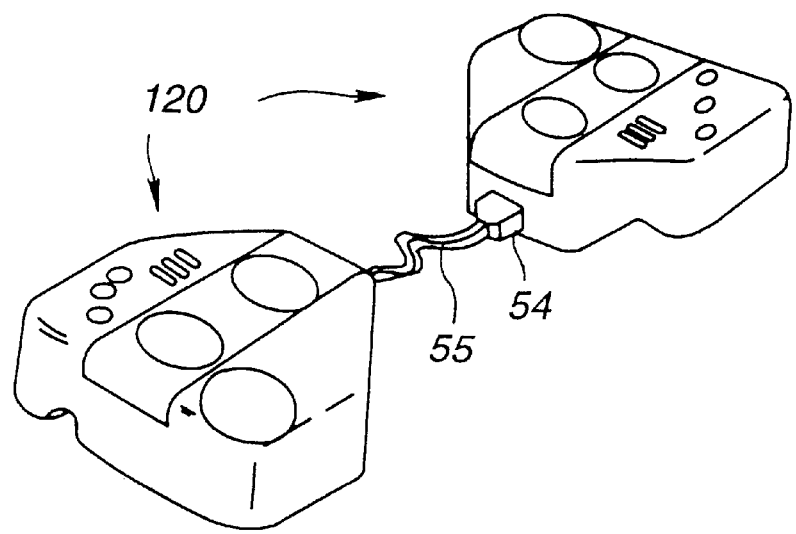
FIG. 18 is a diagram showing a state where the game machine main unit 120 according to this mode of implementation is connected to a further game machine main unit 210.

The game machine main unit 120 is also provided with a socket 54, as illustrated in FIG. 18, whereby it can be connected to a further game machine main unit 120 by means of a connection cord 55. Thereby, games can be played in "2P mode". The internal composition of the game machine is practically the same as that in the first mode of implementation shown in FIG. 6, except that the portion containing the code sensor 23b, buttons 25b–27b and LEDs 31b is omitted.

(2) Operation and Advantages

The operation of the game machine having the composition described above is now described. The basic operation of the game machine according to this mode of implementation is the same as the operation in the case of "1P mode" in the game machine according to the first mode of implementation. The point of difference is that the present mode of implementation comprises a program for generating CPU side characters internally. Below, CPU processing involving this character generating process is described.

FIG. 19 is a flowchart illustrating processing in a game machine according to the present mode of implementation. Firstly, when the player turns the power switch 32 to on, the CPU judges whether or not the game machine main unit 120 is connected to another game machine main unit 120, and whether "2P mode" has been selected by the mode select switch 22 (step SH1). If, as shown in FIG. 18, it is connected to a further game machine main unit 120 by a connection cord 55 and "2P mode" is selected, then 2P mode processing is executed (step SH2). This 2P mode processing is the same as the 2P mode processing in the first mode of implementation.

On the other hand, if "1P mode" is selected by the mode selector switch 33, then the difficulty level is set (step SH3). In this case, when the player sets a new difficulty level using the difficulty switch 53, that value is input and when no new level is set, the current difficulty setting is input.

Next, the device assumes a standby state awaiting code input by the player (step SH4), and if the player sets a disk in the reading section 21a and rotates the disk, the barcode on the disk is read out by the code sensor 23a. The parameters are then set on the basis of the read out barcode (step SH5). This parameter setting process is the same as in the first mode of implementation.

Thereon, the CPU generates a character. Specifically, as described previously, the CPU executes a random generating routine, and using the resulting random number and the aforementioned difficulty level value, it sets life points, defensive power, and punch and kick attack force for the character (step SH6–SH8). In this case, the random number generated by the random generating routine is a numerical value from "1" to "4", and the difficulty level value is a numerical value from "1" to "4", as described above. For example, if the player sets the difficulty level to "3" using the difficulty level switch 53, then when the random generating routine is executed initially and a number "4" is generated, the life points will be set to "7" (step SH6). If a "3" is generated by executing the random generating routine, then the defensive force will be set to "6" (step SH7). The punching force and kicking force are set successively in a similar manner (steps SH8 and SH9). The CPU then set the tricks which can be used with that character (steps SH9 and SH10). In this case, the CPU decides on a first trick by executing the random generating routine to produce a random number between "1" and "30" (step SH9). It then determines a second trick by executing the random generating routine to produce a random number between "31" and "60" (step SH10). Here, the random numbers obtained by running the random generating routine are taken directly as the trick code values. In other words, if "33" is generated, then the trick corresponding to "code 33" recorded in the trick data table is set as an available trick.

When each item of data is set in this way, the CPU supplies the data to the parameter generating section. The parameter generating section then sets parameters on the basis of this data (step SH11). Thereupon, game processing is implemented (step SH12). This game processing is the same as the processing from step SB3 onwards in the 2P mode processing illustrated in FIG. 9. When the 2P mode processing (step SH2) or the aforementioned game processing (step SH12) ends, game completion processing is implemented (step SH13). In this way, according to the present mode of implementation, since an opponent character can be generated when playing a game in 1P mode, it is possible to expect richly varied game development even when playing alone. Furthermore, by connecting to another game machine main unit 120, it is also possible to compete against other players.

C. Third Mode of Implementation

(1) Composition (External Composition)

Figure 20:
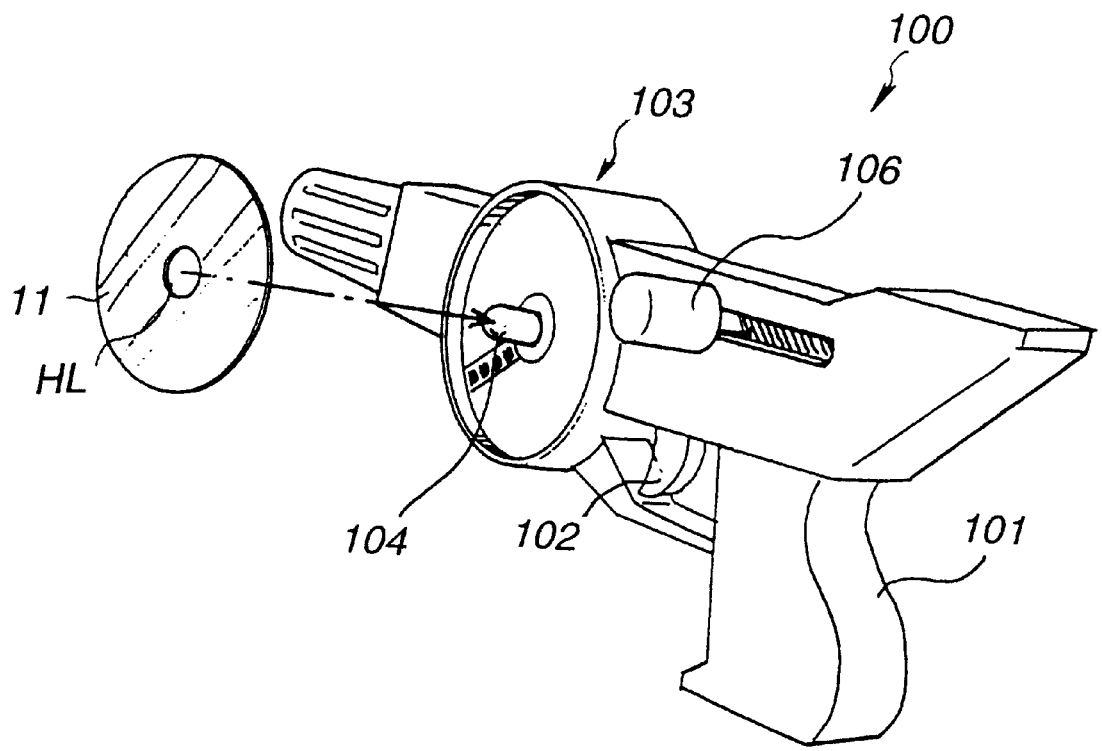
FIG. 20 is an oblique view showing the composition of a sound reproduction system according to a third mode for implementing the present invention.

Next, the composition of a sound reproducing gun according to a third mode for implementing the present invention is described. FIG. 20 is an oblique view showing the external appearance of the gun main unit 100 of the aforementioned sound reproducing gun. In this diagram, a grip 101 which is held by the operator is provided in the gun main unit 100, and sounds are generated by holding this grip 101 and pulling on a trigger 102.

Figure 21:
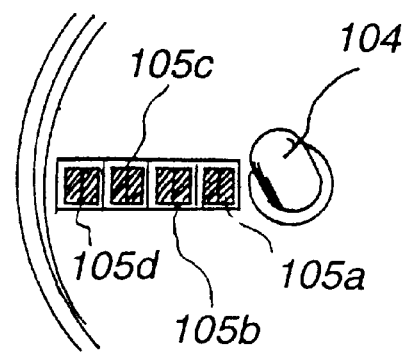
FIG. 21 is a diagram showing the composition of an installing section 103 in this mode of implementation.

A cylindrical installation section 103 for installing a disk 11 is also provided in approximately the central portion of the gun main unit 100. This installing section 103 is constituted such that the disk 11 is set vertically against the side of the gun main unit 100. The disk 11 used in this mode of implementation comprises a centre hole HL in the centre region thereof. As shown in FIG. 21, a rotating axle 104 is provided in the centre region of the installation section 103, and when the aforementioned disk 11 is installed in the installation section 103, this rotating axle 104 fits into the centre hole HL.

The installation section 103 is also provided with four photosensors 105a–105d extending from the central region to the perimeter thereof. These photosensors 105a–105d read out code recorded on the rear surface of the disk 11 installed in the installation section 103.

Figure 22:
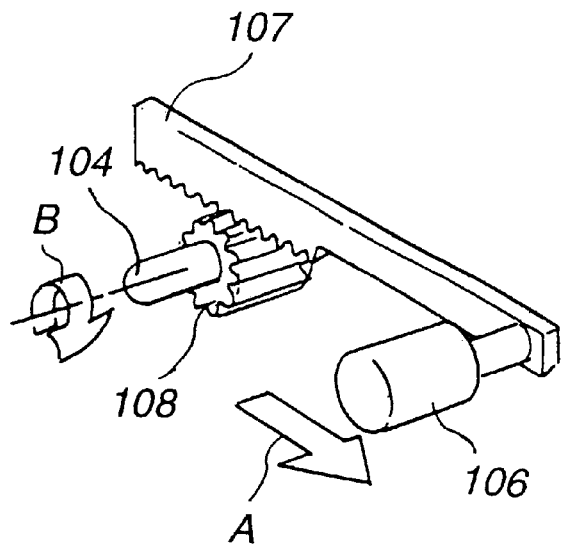
FIG. 22 is a diagram showing the internal composition of a gun main unit 100 according to this mode of implementation.
Figure 23:
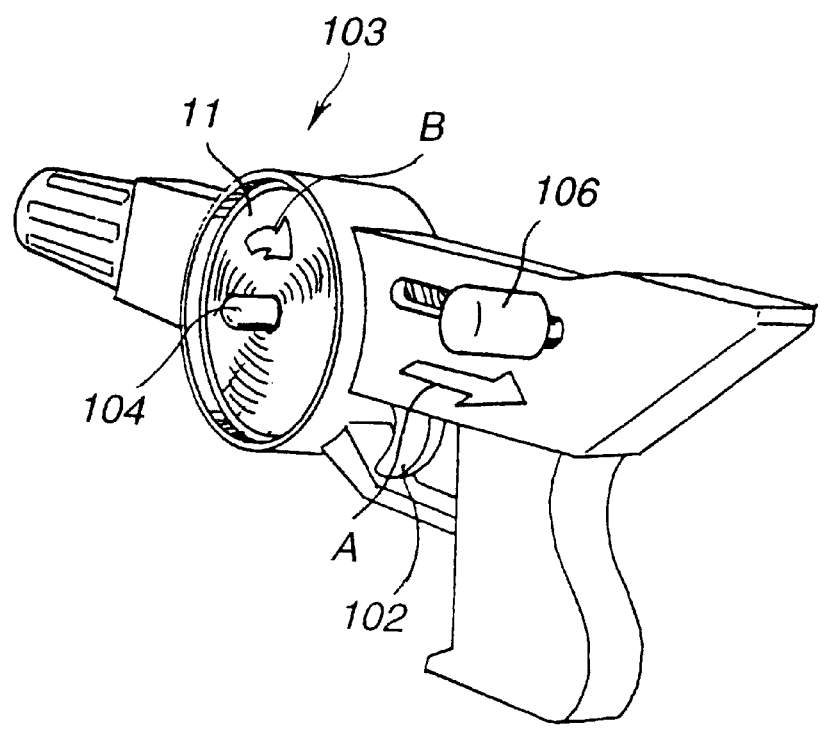
FIG. 23 is a diagram describing the operation of the gun main unit 100 in this mode of implementation.

Furthermore, a lever 106 is provided on the side of the gun main unit 100. As shown in FIG. 22, this lever 106 is attached to the end of a rack 107. The aforementioned rotating axle 104 is connected to a pinion 108, which meshes with this rack 107. By means of this composition, if the lever 106 is moved in the direction of arrow A, the rack 107 will also move in the same direction, and the pinion B will rotate in the direction of arrow B. Accordingly, the rotating axle 104 will also rotate in the direction of the arrow B. With this, the disk 11 installed in the installation section 103 is rotated in the direction of arrow B, as shown in FIG. 23.

(Internal Composition)

Figure 24:
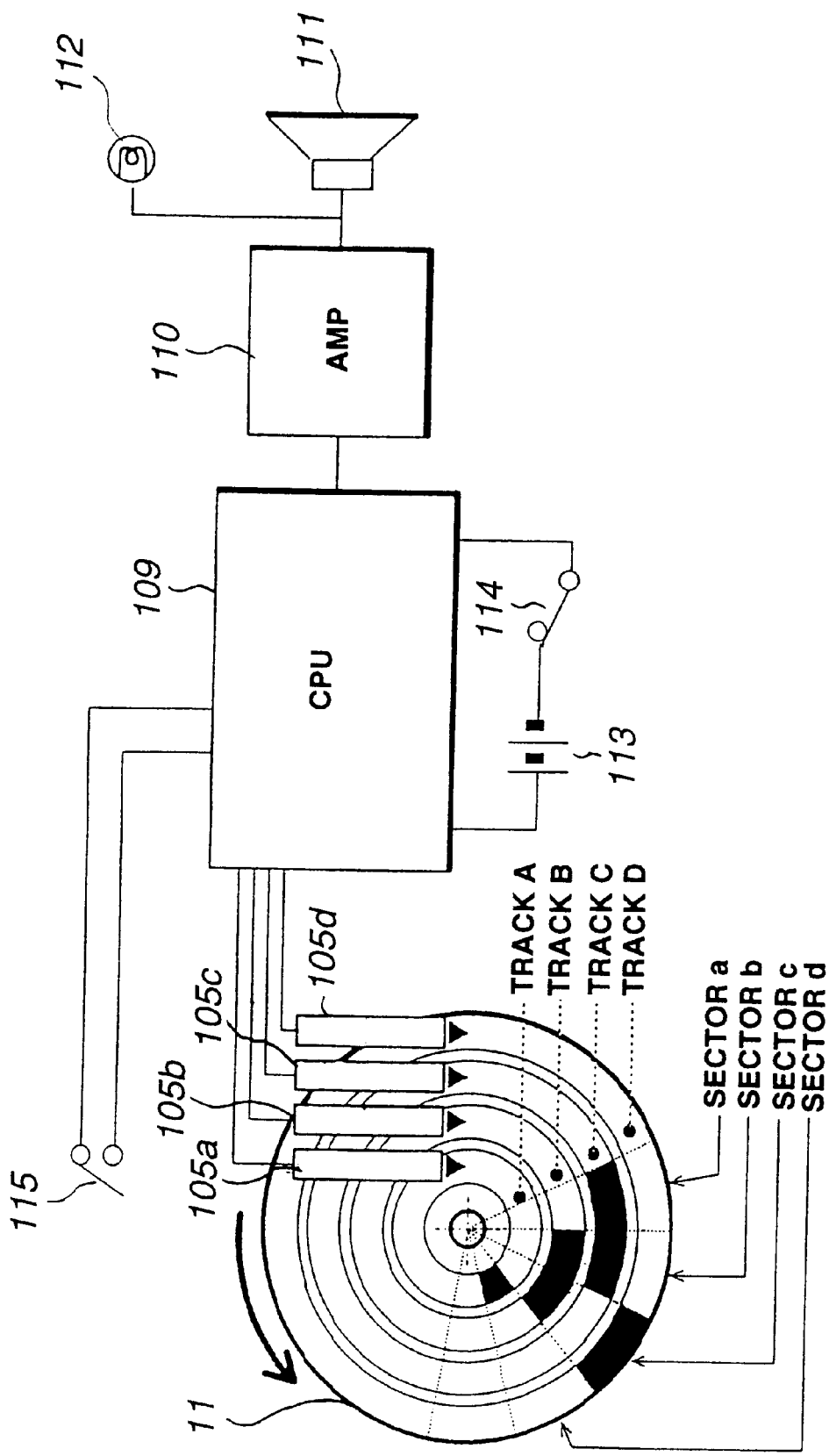
FIG. 24 is a diagram showing the composition of a voice reproduction system in this mode of implementation.

Next, the internal composition of the sound reproducing gun according to the present mode of implementation is described. FIG. 24 shows a system composition for the sound reproducing gun. As this diagram shows, the code marked on the disk 11 comprises four tracks A, B, C, D, and the sound type is indicated by the four sectors a, b, c, d. Data is represented on the disk 11 by the black and white markings of the sectors a, b, c, d in each track A, B, C, D.

The photosensors 105a, 105b, 105c, 105d read out code from the respective tracks A, B, C, D. Specifically, the output signals from each photosensor 105a–105d are output for each sector, and if white is detected, the code is taken as "0", and if black is detected, the code is taken as "1".

The CPU 109 shown in FIG. 24 records sound data corresponding to a plurality of types of sound. It also records a sound data table as shown in FIG. 25. In this sound data table, the black and white markings on the disk 11, in other words, the combination of output signals from the photosensors 105a–105d correspond to sound types. When the CPU 109 inputs a signal from the photosensors 105a–105d, it selects a sound from the sound data table which corresponds to that combination.

For example, in a particular sector, if tracks A–C are white and track D is black, in other words, if the output signals from all of photosensors 105a–105c are "0" and the output signal from photosensor 105d is "1", then "sound (1)" is selected. The CPU 109 records the selected sound type in an internal recording region of the CPU 109. Thereupon, when generating a sound, it refers to this internal recording region and reads out corresponding sound data therefrom.

The CPU 109 is connected to an amplifier 110 and speaker 111, and the sound signal from the CPU 109 is amplified and then output as sound from the speaker 111. The speaker 111 is not illustrated in the gun main unit 100 shown in FIG. 20, but it is provided internally such that it can transmit sounds externally. The amplifier 110 is connected to a light bulb 111, which flashes in synchronism with the sound output by the speaker 111. Moreover, although not shown in the gun main unit 100 illustrated in FIG. 20, a plurality of light bulbs 111 may be provided internally at the end of the gun main unit, for example, such that they transmit light externally. This is not limited to light bulbs, but may also use LEDs.

The CPU 109 is connected to a power supply 113, such as a battery, and a power switch 114. This power switch 114 is provided as the switch of the gun main unit 100 shown in FIG. 20 (omitted from drawing), and when this switch is turned on, a power supply is input to the CPU 109. A sound switch 115 is connected to the CPU 109. This sound switch 115 is turned on by pulling the trigger 102 shown in FIG. 20. When the sound switch 115 is turned to on, the CPU 109 outputs a sound signal corresponding to the sound type recorded in the recording region.

(2) Operation and Advantages

The operation of a sound reproducing gun 100 based on the aforementioned composition is now described. Firstly, the operator inserts a disk 11 in the installation section 103. Thereupon, he or she pulls the lever 106 in the direction of arrow A, as illustrated in FIG. 23. Thereby, the disk 11 is caused to rotate in the direction of arrow B, and the code on the disk 11 is read out by the photosensors 105a–105d.

Here, it is supposed that code is stored on the disk 11 as illustrated in FIG. 24. In other words, sector a is black in track C only, sector b is black in tracks B and C, sector c is black in tracks B and D, and sector d is black in track A only.

In this case, the CPU 109, as a result of referring to the sound data table shown in FIG. 25, selects "sound (2)" with respect to sector a. Similarly, it selects "sound (7)" for sector b, and "sound (5)" for sector c. Sector d represents "sound definition and recording". Therefore, when this signal is input, the selected sound types ("sound (2) ", "sound (7)" and "sound (5)" are stored in the recording region of the CPU 209 for each of sectors a, b, c.

Thereupon, when the operator returns the lever 106 to the original position and pulls the trigger 102, the sound switch 115 shown in FIG. 24 turns on. Thereby, the CPU 109 refers to the aforementioned recording region, and reads out sound data corresponding to the stored sound type. Here, the sound data is read out in the sequence: sector a ->sector b ->sector c.

For example, if sounds are stored in the order "sound (2)", "sound (7)" and "sound (5)", then each time the operator pulls the trigger 102, the sounds will be generated in reverse order "sound (2)"->"sound (7)"->"sound (5)"->"sound (2)"->"sound (7)"->"sound (5)"->. . . Here, if "sound (2)" is a beeping noise, "sound (7)" is a hooting noise, and "sound (5)" is a whirring noise, then these will be generated consecutively in the form "beep-hoot-whirr-beep-hoot-whirr . . . ".

As described above, once the type of sound has been set by installing a disk 11 and pulling the lever 106, sounds can be generated by pulling the trigger 102, even if the disk 11 is subsequently removed. By installing a new disk bearing different patterns, and similarly pulling lever 106 to set the type of sound, the sound type stored in the recording region is updated. Thereupon, sound is generated corresponding to this newly recorded sound.

In this way, it is possible to generate different sounds by changing disks 11.

(3) Further Compositional Example

In the aforementioned mode of implementation, a lever was provided for rotating the disk 11, but besides this, it is also possible to rotate the disk 11 directly by hand.

D. Further Modes of Implementation

Next, further modes for implementing a disk 10 are described.

(1) Writeable Barcode System

Figure 26A:
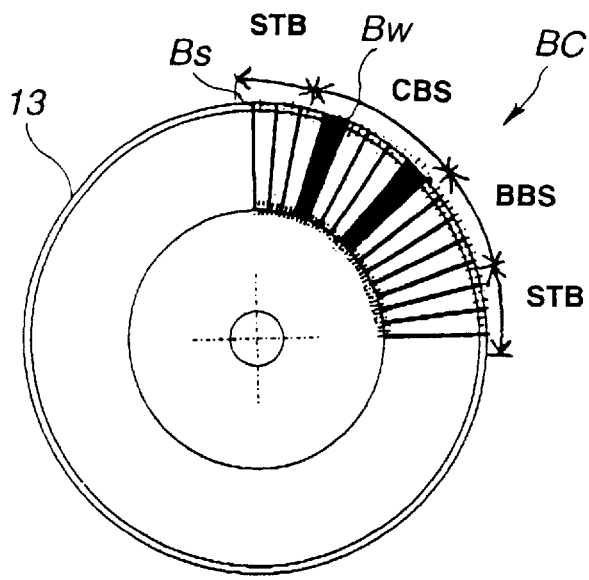
FIG. 26 shows diagrams describing a method of writing a barcode BC to a disk 13.

The disk 10 according to the first and second modes of implementation carried predetermined barcodes recorded thereon, but it is also possible to add new barcode to the recorded barcode. A method for adding barcode is described below with reference to FIG. 26. As shown in FIG. 26(a), a barcode BC consisting of a start bit STB, code bit sector CBS, blank bit sector BBS and end bit EDB is recorded on a disk 13. The following rules apply to this barcode BC. Namely, a thin bar $B_S$ which is narrower than the spaces between the bars represents "0", and a thick bar $B_W$ which is wider than the spaces represents "1". The narrow bars $B_S$ are all arranged equidistantly, and the thick bars $B_W$ are created by filling in the gap between two narrow bars $B_S$.

In FIG. 26(a), bits comprising "1001" are set in the code bit sector CBS, and therefore, the barcode BC of this disk 13 represents "1001", which means that the code "1001" applies to this disk 13. In this case, the blank bit sector BBS is set to "0000".

Figure 26B:
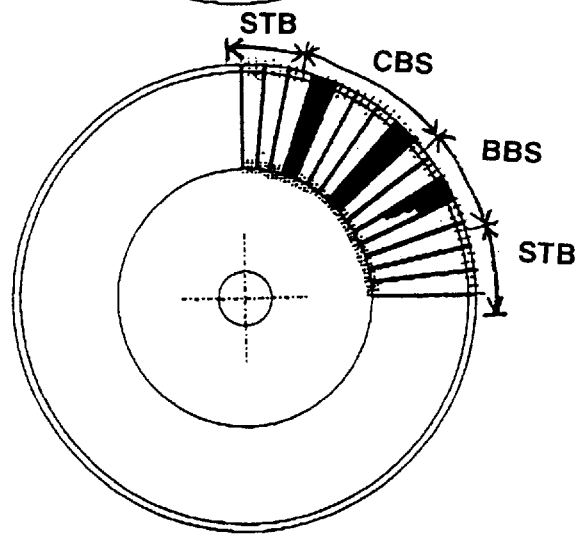
Figure 26C:
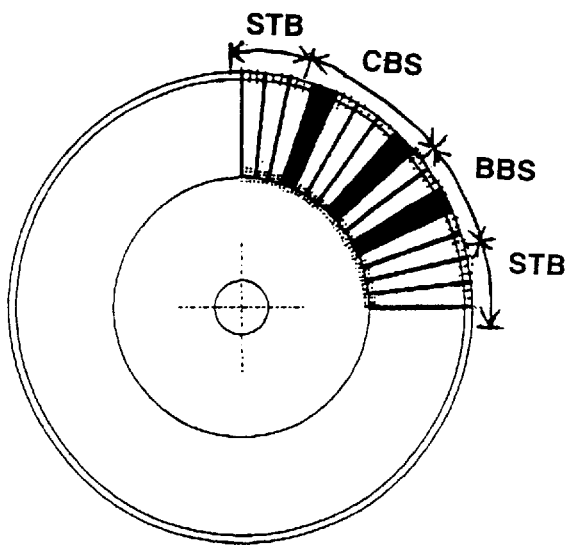

In FIG. 26(b), the gap between the two central bars of the four bars in the blank bit sector BBS is filled in. Therefore, the bits "010" are set in the blank bit sector BBS. Consequently, the barcode BC of the disk 10 represents "1001010".

By adding barcode in this way, it is possible to change characteristics, such as the strength on a particular disk 10. Additionally, players can create their own disks.

(2) Dot System

Figure 27A:
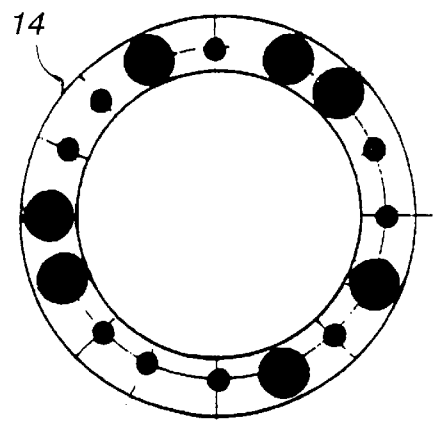
FIG. 27(a) shows the composition of a disk 14.
Figure 27B:
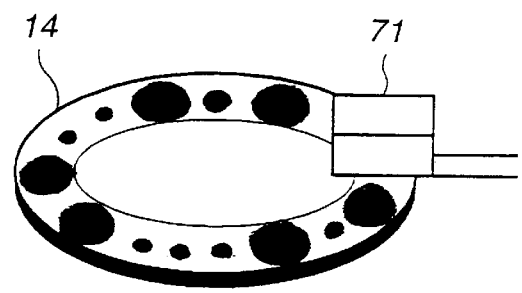
FIG. 27(b) illustrates a method of detecting dots on the disk 14.
Figure 27C:
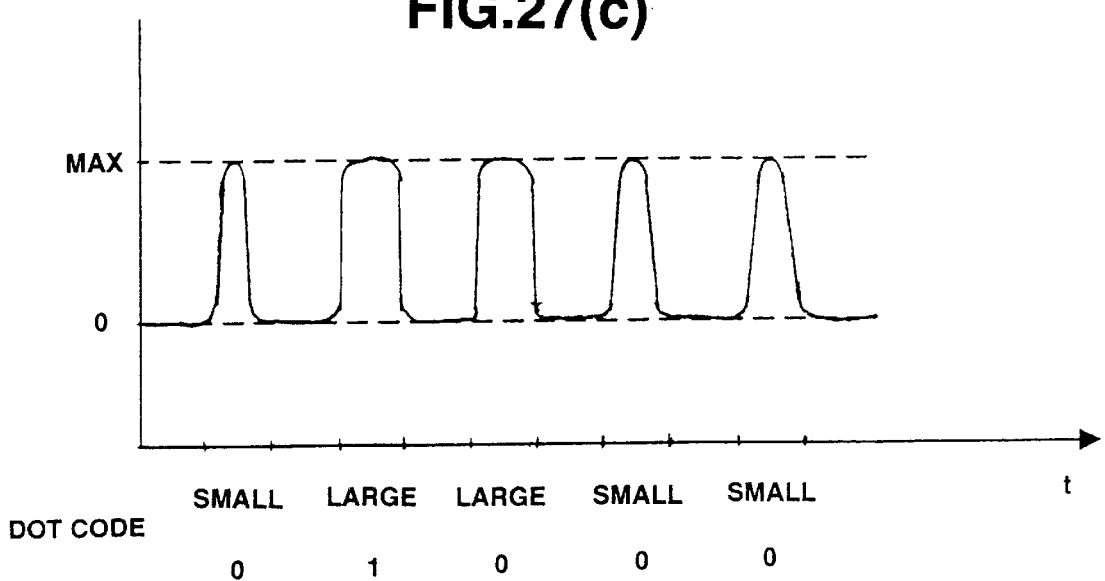
FIG. 27(c) shows an output signal from a code sensor 71.

In the disk 14 shown in FIG. 27, dots are recorded instead of barcode. These dots comprises large dots and small dots. In this case, the code sensor 71 detects the size of each dot, as shown in FIG. 27(b). Thereupon, as shown in FIG. 27(c), a signal is output by the code sensor 71 in accordance with the size of the dot. The CPU 45 shown in FIG. 6 then determines whether or not the data is "1" or "0" depending on the length of the signal.

When a disk 14 of this kind is used in a sound reproducing gun according to the third and fourth modes of implementation, one item of data is constituted by a plurality of consecutive dots, for example, and the type of sound is set according to this data.

(3) Plural Track System

Figure 28:
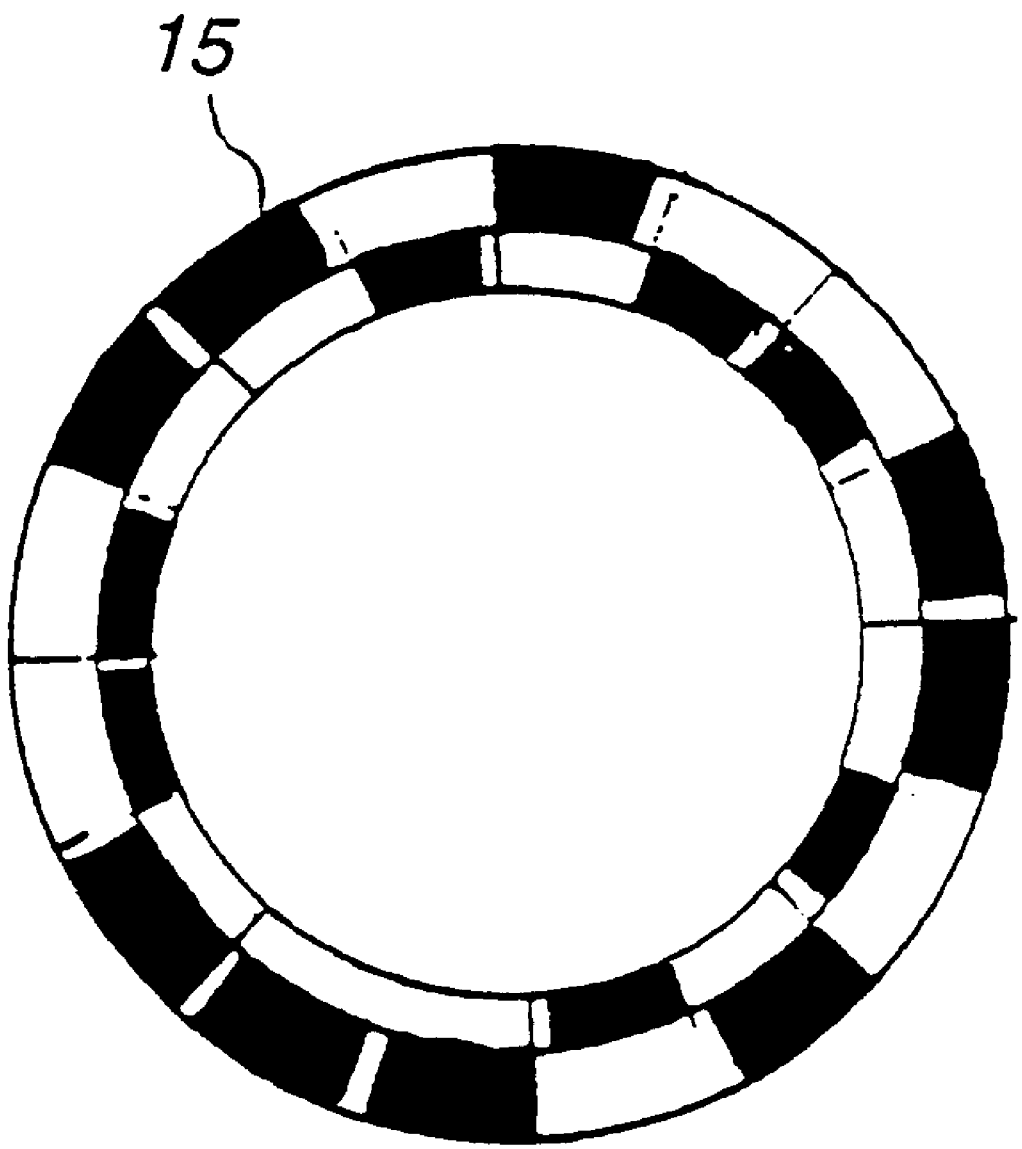
FIG. 28 shows the composition of a disk 15.
Figure 29A:
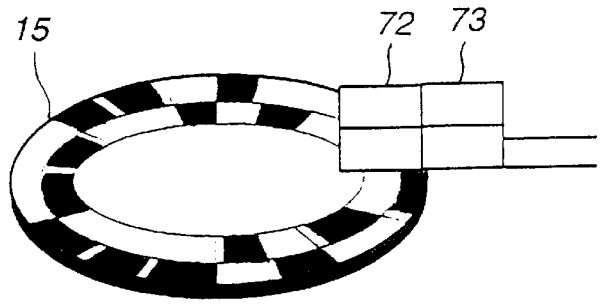
FIG. 29(a) shows a method of detecting codes on a disk 15.
Figure 29B:
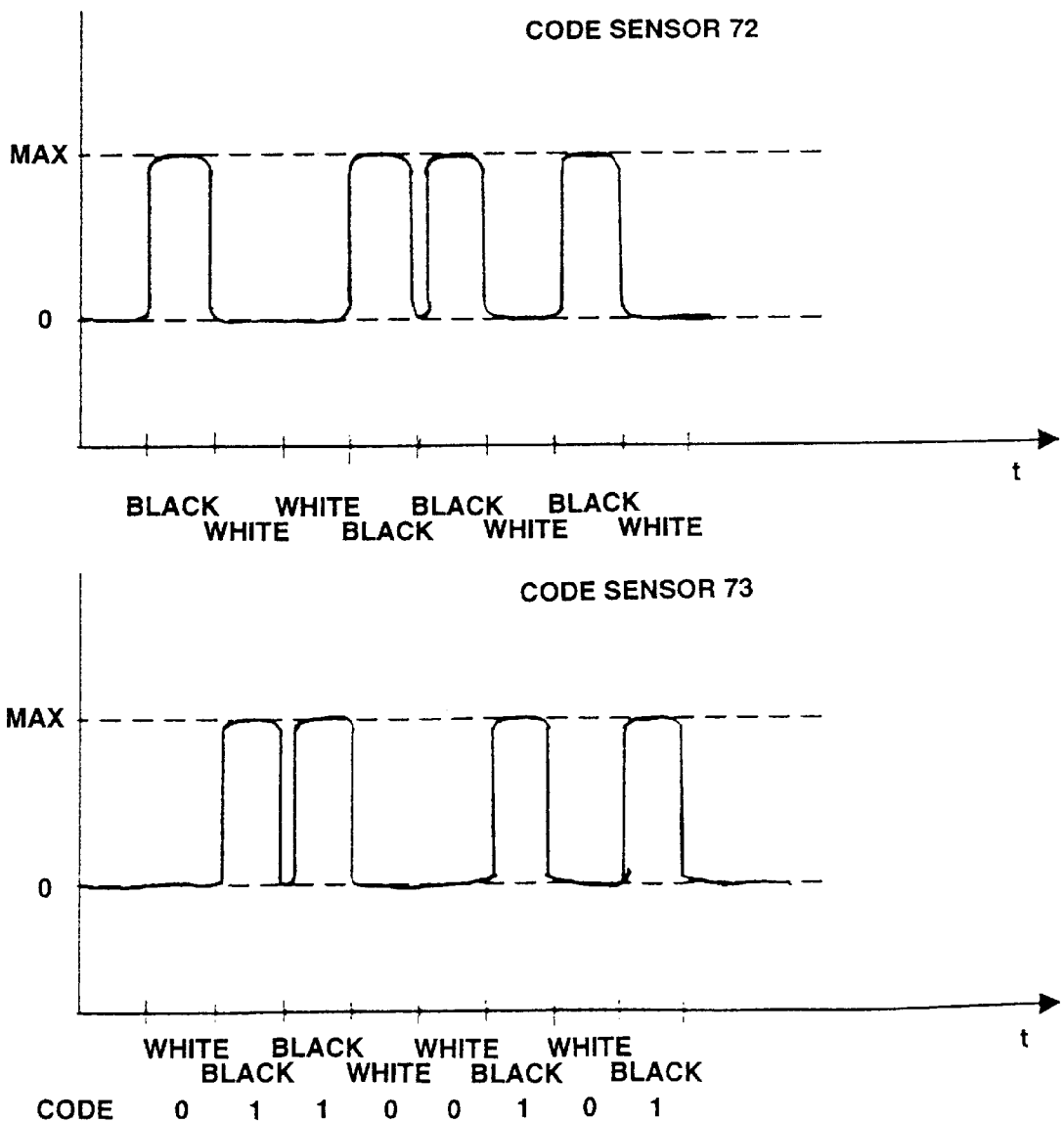
FIG. 29(b) shows output signals from code sensors 72, 73.

The disk 15 shown in FIG. 28 contains code formed into a plurality of tracks. The disk 15 shown in the diagram has two tracks, and one circumference contains 16 sectors. In this case, as shown in FIG. 29(a), code sensors 72, 73 are provided according to the number of tracks, and these detect whether the respect sectors are black or white. Furthermore, the code sensor 72 detects the code on the inner track, and the code sensor 73 detects the code on the outer track. The output signal from the code sensors 72 and 73 is "on" when the sector is black, and it is "off" when the sector is white. In this case, if the CPU 45 etc. detects that the output signal from the code sensor 72 is "on", the data is judged to be "1", and if it is "off", the data is judged to be "0". As shown in FIG. 29(b), since the inner track is of the opposite colour to the outer track, when the output signal from code sensor 72 is "1", the output signal from code sensor 73 is "0", and when the output signal from the code sensor 72 is "0", the output signal from code sensor 73 is "1".

By detecting code by means of a plurality of code sensors in this way, it is possible to conduct data read-out more reliably than if one code sensor is used.

Figure 30:
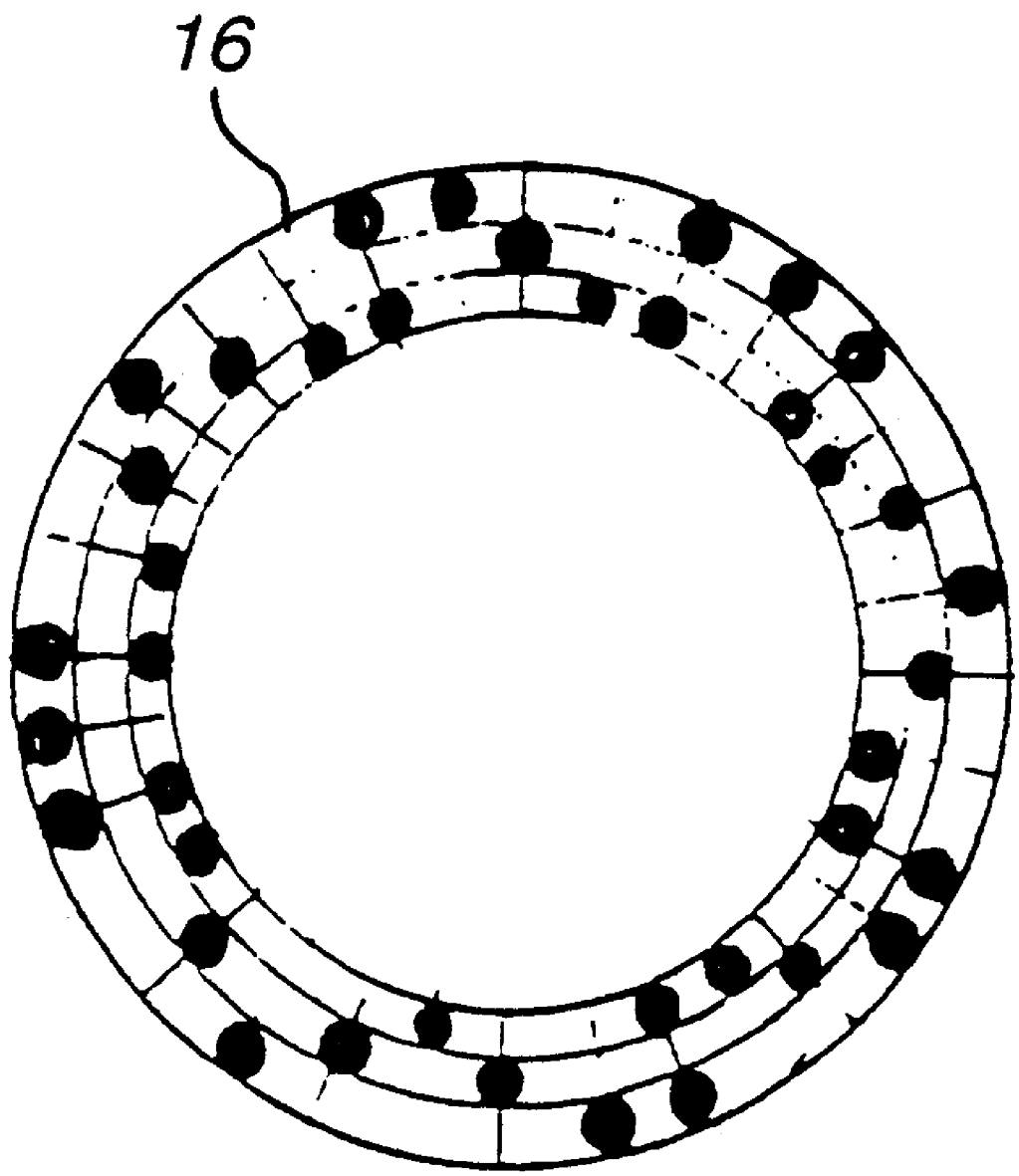
FIG. 30 shows the composition of a disk 16.

The disk 16 shown in FIG. 30 has 3 tracks, and one circumference contains 32 sectors. Here, dots are formed on one or two of the three tracks in accordance with the sectors. Similarly to FIG. 29(a), a code sensor is provided for each track and the output signal from these is "on" when a black dot is detected, and it is "off" when a white dot is detected. Data is set by the combination of output signals from the three code sensors. For example, sounds are previously set by black and white combinations in each track, and the sound is determined by the detected combination.

INDUSTRIAL APPLICABILITY

As described above, according to the present invention, the aforementioned pattern is read out by the reading means by installing an information storage medium in an information reproducing device and causing it to rotate. In game machines which use cards bearing conventional barcode, the barcode is only read out once, but by using and rotating an information storage medium according to the present invention, it is possible to input patterns continuously. Therefore, it is possible to realize a new information reproduction device which inputs information by means of the information storage medium being caused to rotate, and a new game machine which inputs commands by means of the information storage medium being caused to rotate. In a game machine of this kind, game development having a sense of urgency can be anticipated by causing a circular or other shape of information storage medium to rotate.

What is claimed is:

1. A game device comprising:

holding means for holding rotatably an information storage medium whereon a pattern formed by encoding information according to prescribed rules of a game are arranged in a circular fashion, constituted such that the information storage medium is rotated manually, the holding means being manually rotatable in left and right directions so as to provide first information when the holding means is manually rotated in the left direction and second information when the holding means is manually rotated in the right direction;

reading means for reading out a pattern arranged on the information storage medium when said information storage medium held by said holding means is manually rotated in either of the left and right directions; and reproducing means for reproducing information corresponding to the pattern read out by said reading means, so as to perform operations of the game; wherein said first information relates to an action performed by an object in the game in a first manner, and said second information relates to said action performed by the object in the game in a second manner.

2. A game device comprising:

holding means for holding rotatably an information storage medium whereon one or more patterns formed by encoding information according to prescribed rules of a game are arranged in a circular configuration, the holding means being manually rotatable in left and right directions so as to provide first information when the holding means is manually rotated in the left direction and second information when the holding means is manually rotated in the right direction;

reading means for reading out said one or more patterns arranged on the information storage medium, respectively, when said information storage medium held by said holding means is manually rotated in either of the left and right directions; and reproducing means for reproducing information corresponding to the patterns read out by said reading means, respectively, so as to perform operations of the game; wherein said first information relates to an action performed by an object in the game in a first manner, and said second information relates to said action performed by the object in the game in a second manner.

3. A game device comprising:

holding means for holding rotatably an information storage medium whereon one or more patterns formed by encoding information according to prescribed rules of a game are arranged in a circular configuration, the holding means being manually rotatable in left and right directions so as to provide first information when the holding means is manually rotated in the left direction and second information when the holding means is manually rotated in the right direction;

one or more reading means for reading out said patterns arranged on the information storage medium, respectively, constituted such that they are movable over said information storage medium held in said holding means; and reproducing means for reproducing information corresponding to the patterns read out respectively by said reading means, so as to perform operations of the game; wherein said first information relates to an action performed by an object in the game in a first manner, and said second information relates to said action performed by the object in the game in a second manner.

4. The game device according to claim 1, wherein said pattern is a barcode, and said reading means is constituted such that it reads barcodes optically.

5. The game device according to claim 1, wherein said reproducing means comprises: identifying means for identifying a pattern read by said reading means as code; storing means for storing a plurality of codes and the information corresponding thereto; and read-out means for reading out said information from said storing means.

6. The game device according to claim 5, wherein said storing means stores sound data as said information, and said reproducing means comprises output means for outputting said sound data read out by said read-out means, in the form of sound.

7. A method of operating a game device including an information reproduction device, into which an information storage medium, whereon patterns formed by encoding information according to prescribed rules are arranged in a circular fashion, is installed rotatably so as to be manually rotatable in the left direction and the right direction, the method comprising the steps of:

storing a plurality of codes and information corresponding thereto in storing means;

reading said pattern arranged on the information storage medium, when said information storage medium is manually rotated in either of the left and right directions;

identifying said read pattern as code;

reading out said information from said recording means in accordance with said identified code so as to read out first information when the holding means is manually rotated in the left direction and to read out second information when the holding means is manually rotated in the right direction and reproducing said read out information; wherein said first information relates to an action performed by an object in the game device in a first direction, and said second information relates to said action performed by the object in the game device in a second direction.

* * * * *